(12) United States Patent
Woodman et al.

(10) Patent No.: US 11,530,047 B2
(45) Date of Patent: *Dec. 20, 2022

(54) UNMANNED AERIAL VEHICLE WITH ROTATING AND OVERLAPPING ROTOR ARMS

(71) Applicant: GoPro, Inc., San Mateo, CA (US)

(72) Inventors: Nicholas D. Woodman, Big Sky, MT (US); Pablo German Lema, San Mateo, CA (US); Seung Heon Lee, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 16/915,036

(22) Filed: Jun. 29, 2020

(65) Prior Publication Data
US 2020/0391878 A1     Dec. 17, 2020

Related U.S. Application Data

(63) Continuation of application No. 15/331,707, filed on Oct. 21, 2016, now Pat. No. 10,696,414, which is a
(Continued)

(51) Int. Cl.
*B64D 27/26*     (2006.01)

(52) U.S. Cl.
CPC ........ *B64D 27/26* (2013.01); *B64C 2201/027* (2013.01); *B64C 2201/042* (2013.01); *B64C 2201/108* (2013.01); *B64C 2201/127* (2013.01)

(58) Field of Classification Search
CPC .................. B64C 2201/027; B64C 2201/108
See application file for complete search history.

(56) References Cited

U.S. PATENT DOCUMENTS

D189,462 S    12/1960   Vogt
D197,038 S    12/1963   Howard
(Continued)

FOREIGN PATENT DOCUMENTS

CN     201816723 U    5/2011
CN     103025609 A    4/2013
(Continued)

OTHER PUBLICATIONS

'Best Drone for GoPro,' Drone by GoPro, Retrieved online on Apr. 27, 2016, 4 pages, Retrieved from the internet <URL:http://dronegopro.org/>.
(Continued)

*Primary Examiner* — Jessica B Wong
(74) *Attorney, Agent, or Firm* — Young Basile Hanlon & MacFarlane, P.C.

(57) ABSTRACT

An unmanned aerial vehicle comprises a housing, a plurality of first arms, a plurality of second arms, and a landing gear. The housing includes a gimbal attachment to couple a gimbal with a camera. Each of the plurality of first arms and the plurality of second arms rotatably couple with the housing at one end and has a motor coupled with a propeller on the other end. The landing gear includes a plurality of foldable legs and releasably couples with an underside of the housing. The aerial vehicle may be programmed with aerial flight path data that corresponds with a prior traced route.

13 Claims, 21 Drawing Sheets

Related U.S. Application Data continuation-in-part of application No. 29/578,014, filed on Sep. 16, 2016, now Pat. No. Des. 803,098, which is a continuation of application No. 29/535,225, filed on Aug. 4, 2015, now Pat. No. Des. 768,539, and a continuation of application No. PCT/US2016/028508, filed on Apr. 20, 2016, and a continuation-in-part of application No. 29/549,171, filed on Dec. 18, 2015, now Pat. No. Des. 803,328.

(60) Provisional application No. 62/302,114, filed on Mar. 1, 2016, provisional application No. 62/279,621, filed on Jan. 15, 2016, provisional application No. 62/199,356, filed on Jul. 31, 2015, provisional application No. 62/150,703, filed on Apr. 21, 2015.

(56) References Cited

U.S. PATENT DOCUMENTS

| | | | |
|---|---|---|---|
| D349,520 S | 8/1994 | Iwakami | |
| 5,465,142 A | 11/1995 | Krumes | |
| D367,895 S | 3/1996 | Goto | |
| D383,800 S | 9/1997 | Ishizaki | |
| D411,863 S | 7/1999 | Chan | |
| D448,810 S | 10/2001 | Goto | |
| D460,450 S | 7/2002 | Goto | |
| D465,196 S | 11/2002 | Dammar | |
| D547,763 S | 7/2007 | Hayes | |
| 7,376,494 B2 | 5/2008 | Arnouse | |
| D603,457 S | 11/2009 | Julskjer | |
| D628,658 S | 12/2010 | Wurm | |
| 7,876,359 B2 | 1/2011 | Von | |
| D631,922 S | 2/2011 | Kang | |
| D637,241 S | 5/2011 | Cheng | |
| 8,052,081 B2 * | 11/2011 | Olm | B64C 39/024 244/17.23 |
| D657,005 S | 4/2012 | Zahornacky | |
| 8,265,808 B2 | 9/2012 | Garrec | |
| 8,292,215 B2 | 10/2012 | Olm | |
| D672,397 S | 12/2012 | Wai | |
| D691,514 S | 10/2013 | Wang | |
| D710,452 S | 8/2014 | Barajas | |
| D710,453 S | 8/2014 | Barajas | |
| D710,454 S | 8/2014 | Barajas | |
| 8,967,029 B1 | 3/2015 | Calvert | |
| 8,973,861 B2 | 3/2015 | Zhou | |
| 8,989,922 B2 | 3/2015 | Jones | |
| 9,061,763 B1 | 6/2015 | Christensen | |
| 9,099,902 B2 | 8/2015 | Chen | |
| D741,751 S | 10/2015 | Klaptocz | |
| D741,779 S | 10/2015 | Hsiao | |
| 9,164,506 B1 | 10/2015 | Zang | |
| 9,280,038 B1 | 3/2016 | Pan | |
| D768,539 S | 10/2016 | Lee | |
| 9,501,061 B2 | 11/2016 | Canoy | |
| 9,878,786 B2 * | 1/2018 | Chan | B64C 27/52 |
| 9,902,491 B2 * | 2/2018 | Chan | B64C 27/37 |
| 9,919,797 B2 * | 3/2018 | Chan | B64C 27/08 |
| 10,696,414 B2 * | 6/2020 | Woodman | B64C 25/54 |
| 11,198,500 B2 * | 12/2021 | Yang | B64C 1/30 |
| 2007/0236366 A1 | 10/2007 | Gur | |
| 2009/0008499 A1 | 1/2009 | Shaw | |
| 2010/0108801 A1 * | 5/2010 | Olm | B64C 39/024 244/17.23 |
| 2011/0001001 A1 | 1/2011 | Bryant | |
| 2012/0065881 A1 | 3/2012 | McIver | |
| 2012/0083945 A1 | 4/2012 | Oakley | |
| 2012/0121412 A1 | 5/2012 | Hoover | |
| 2012/0138732 A1 * | 6/2012 | Olm | B64C 39/024 244/17.23 |
| 2012/0283897 A1 | 11/2012 | Barraci | |
| 2014/0061376 A1 | 3/2014 | Fisher | |
| 2014/0117149 A1 | 5/2014 | Zhou | |
| 2014/0249693 A1 | 9/2014 | Stark | |
| 2014/0263823 A1 | 9/2014 | Wang | |
| 2014/0277854 A1 | 9/2014 | Jones | |
| 2014/0339355 A1 | 11/2014 | Olm | |
| 2015/0012154 A1 | 1/2015 | Senkel | |
| 2015/0051755 A1 | 2/2015 | Erhart | |
| 2015/0060606 A1 | 3/2015 | Wang | |
| 2015/0129711 A1 | 5/2015 | Caubel | |
| 2015/0210388 A1 | 7/2015 | Criado | |
| 2015/0259066 A1 | 9/2015 | Johannesson | |
| 2015/0274309 A1 | 10/2015 | Shi | |
| 2015/0321755 A1 | 11/2015 | Martin | |
| 2015/0336670 A1 | 11/2015 | Zhang | |
| 2016/0001879 A1 | 1/2016 | Johannesson | |
| 2016/0031275 A1 | 2/2016 | Monroe | |
| 2016/0068261 A1 | 3/2016 | Niederberger | |
| 2016/0159471 A1 | 6/2016 | Chan | |
| 2016/0159472 A1 * | 6/2016 | Chan | B64C 27/37 244/39 |
| 2016/0176520 A1 | 6/2016 | Goldstein | |
| 2016/0272310 A1 * | 9/2016 | Chan | B64D 1/00 |
| 2016/0304199 A1 * | 10/2016 | Chan | B64C 27/08 |
| 2017/0001721 A1 | 1/2017 | Saika | |
| 2017/0036771 A1 | 2/2017 | Woodman | |
| 2020/0079495 A1 * | 3/2020 | Yang | B64C 1/16 |

FOREIGN PATENT DOCUMENTS

| | | |
|---|---|---|
| CN | 104386249 A | 3/2015 |
| CN | 303368298 | 9/2015 |
| EP | 2908203 A1 | 8/2015 |
| IS | 711170016 | 1/2009 |

OTHER PUBLICATIONS

3D Robotics, Inc., 'Iris Operational Manual,' Oct. 16, 2013, 35 Pages, [online] [Retrieved on Apr. 29, 2016] Retrieved from the Internet <URL:https://3dr.com/wp-content/uploads/2013/10/operation-manual-compressed.pdf>.

Amazon.com: Parabolic Antenna DJI Signal Booster and Range Extender, review Apr. 2016, https://www.amazon.com/Parabolic-Antenna-Booster-Extender-Advanced/dp/B01- DK4JQNE/ref=cm_cr_arp_d_product_top?ie=UTF8, site visited Sep. 28, 2016. (8 pages).

Brown, E., "AirDog auto-follow drone for GoPro smashes Kickstarter targets," Social Business, Jul. 9, 2014, 4 pages, [online] [retrieved on Sep. 22, 2016] Retrieved from the internet <URL:http://www.zdnet.com/article/airdog-auto-follow-drone-for-gopro-smashes-kickstarter-targets/.

DJI Innovations, 'PHANTOM FC40 User Manual,' Mar. 21, 2014, 31 Pages, [online] [Retrieved on Apr. 29, 2016] Retrieved from the Internet <URL:http://dl.djicdn.com/downloads/phantom_fc40/en/Phantom_FC40_User_Manual_v1.06_en.pdf>.

DJI Innovations, 'Phantom Quick Start Manual V1.2,' 2012, pp. 1-16, [online] [Retrieved on Apr. 29, 2016] Retrieved from the Internet <URL:http://www.rapidonline.com/pdf/595538_an_en_01.pdf>.

European Extended Search Report for 16783799.6 , dated Feb. 14, 2018, 7 pages.

Fantomas, 'Guide to the Phantom 2 Vision & Vision+,' Dec. 4, 2014, 49 Pages, [online] [Retrieved on Apr. 29, 2016] Retrieved from the Internet <URL:http://www.droneflyersxom/wp-content/uploads/2014/12/DJI-Phantom-Vision-Sum mary-Guide.pdf>.

hobbyking.com, 'NOVA Manual,' 1 page, [online] [Retrieved on Apr. 29, 2016] Retrieved from the Internet <URL:http://www.hobbyking.com/hobbyking/store/uploads/65525800X365809X9.pdf>. (1 page).

Horizon Hobby, Inc., 'Blade 350 QX Instruction Manual,' 2013, 20 Pages, [online] [Retrieved on Apr. 29, 2016] Retrieved from the Internet <URL:http://www.bladehelis.com/ProdInfo/Files/BLH7800-Manual_EN.pdf>.

Johnson, M., 'Heli Pilot Review,' DJI-Innovations, Apr. 2013, pp. 22-26, [online] [Retrieved on Apr. 29, 2016] Retrieved from the Internet <URL:http://www.visual-aerials.com/uploads/3/3/9/9/3399523/visual-aerials_rc_hel i_phantom_april2013.pdf>.

(56) References Cited

OTHER PUBLICATIONS

Krassenstein, B., "AirDog, World's First Auto-follow Deon Designed to Track and Record Activities, is Entirely 3D Printed," 3dpring.com, 3DR Holdings, LLS, 12 pages, [online] [retrieved on Sep. 22, 2016] Retrieved from the internet <URL:https://3dprint.com/7193/airdong-drone-3d-print/>.
Office Action for Canadian Patent Application No. CA 169042, dated Jan. 12, 2017, 5 Pages.
Office Action for Russian Design Application No. RU 2016502372, dated Mar. 10, 2017, 4 Pages (With English Translation).
Office Action for U.S. Appl. No. 15/331,707, dated Jun. 5, 2017, 10 Pages.
PCT International Search Report and Written Opinion for PCT/US16/28508, dated Sep. 6, 2016, 15 Pages.
TBS Discovery, 'TBS Discovery Quadrotor,' ivc.no, Sep. 21, 2014, 33 Pages, [online] [Retrieved on Apr. 29, 2016] Retrieved from the Internet <URL:http://www.team-blacksheep.com/tbs-disco very-manual.pdf>.
United States Office Action, U.S. Appl. No. 15/134,284, dated Jul. 13, 2016, 16 pages.

\* cited by examiner

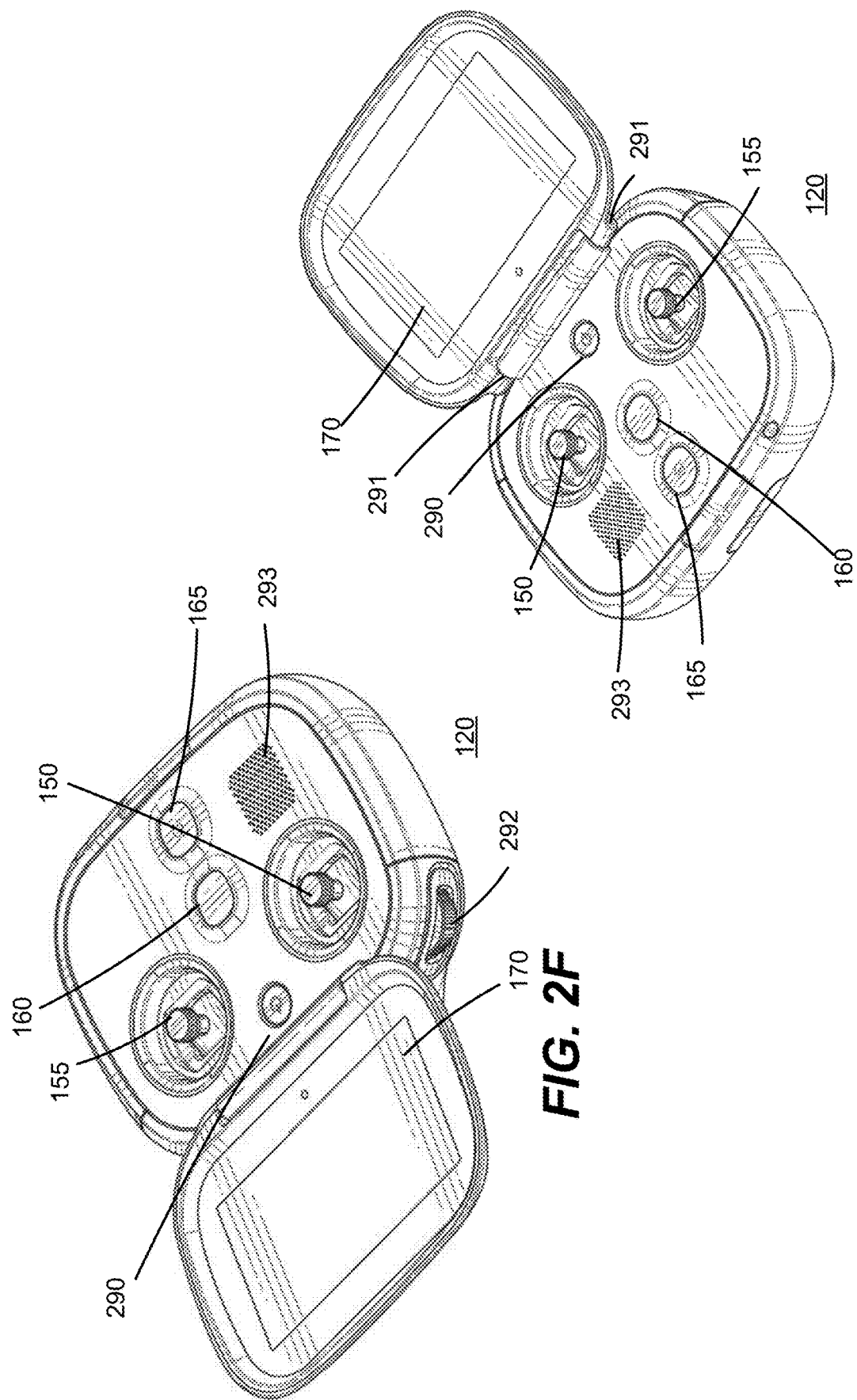

708

UNMANNED AERIAL VEHICLE WITH ROTATING AND OVERLAPPING ROTOR ARMS

CROSS REFERENCE TO RELATED APPLICATION

This application is a continuation application of U.S. application Ser. No. 15/331,707, filed Oct. 21, 2016, which is a continuation application of International Application No. PCT/US2016/028508, filed on Apr. 20, 2016, which application claims the benefit of U.S. Provisional Application No. 62/302,114, filed Mar. 1, 2016, U.S. Provisional Application No. 62/279,621, filed Jan. 15, 2016, U.S. Provisional Application No. 62/199,356, filed Jul. 31, 2015, and U.S. Provisional Application No. 62/150,703, filed Apr. 21, 2015, the content of each of which is incorporated by reference in its entirety. This application also is a continuation-in-part of (1) U.S. Design application Ser. No. 29/578,014, filed Sep. 16, 2016, which application is a continuation of U.S. Design application Ser. No. 29/535,225, filed Aug. 4, 2015, now U.S. Pat. No. D768,539, and (2) a continuation-in-part of U.S. Design application Ser. No. 29/549,171, filed Dec. 18, 2015, the content of each of which is incorporated by reference in its entirety.

TECHNICAL FIELD

The disclosure generally relates to unmanned aerial vehicles, for example, unmanned aerial vehicles with cameras.

BACKGROUND

Remote controlled devices with image capture devices, e.g., cameras mounted upon those devices, are known. For example, a remote control road vehicle can be configured to mount a camera on it to capture images as the vehicle is moved about remotely by a user. Similarly, remote controlled aerial vehicles, e.g., drones or quadcopters, have been mounted with cameras to capture aerial images through the camera as a user remotely controls the vehicle.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example configuration of remote controlled aerial vehicle in communication with a remote controller.

FIGS. 2F and 2G illustrate an example remote controller in an open position.

DETAILED DESCRIPTION

Figure 1:
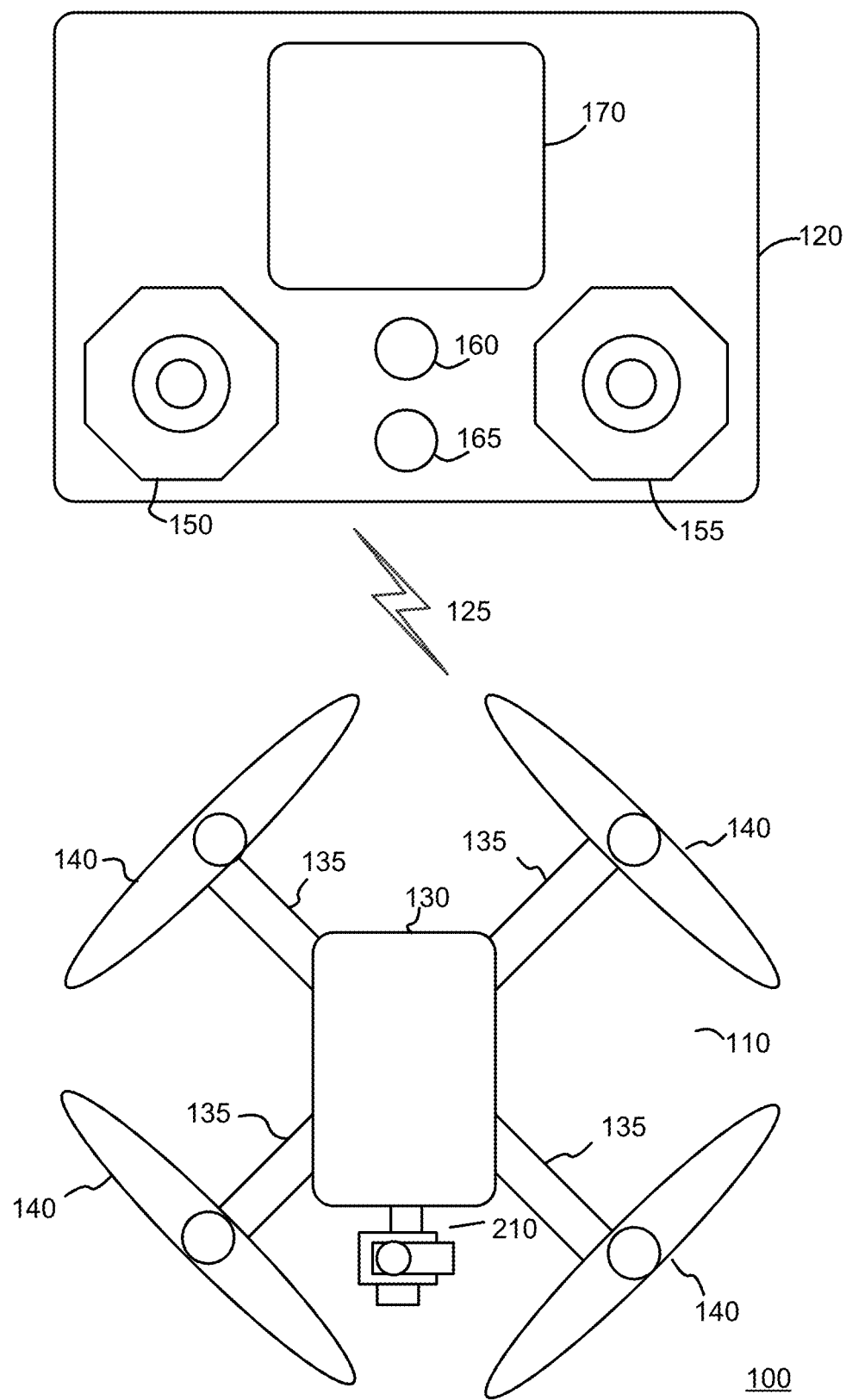

The Figures (FIGS.) and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an aerial capture platform. The aerial capture platform may include a remote controlled aerial vehicle coupled with a camera and may include a remote controller. The remote controlled aerial vehicle may also be referenced as an unmanned aerial vehicle ("UAV") and/or drone. The aerial vehicle may be remotely controlled through a remote controller. The camera further may be coupled with a mounting structure (or configuration).

The remote controlled aerial vehicle can be directly and immediately controlled for flight. For example, the aerial vehicle may be operated remotely (e.g., via wireless connection) from a remote controller by a user. Remote controlled aerial vehicles may be pre-programmed for flight (e.g., a predetermined flight route (or path) as further described herein), and no control, or limited control, may be exercised via the remote controller during flight. Such configurations may be referred to as autopilot. Examples of limited control may be a manual override or a flight adjustment to the pre-programmed flight. For ease of discussion reference to aerial vehicle operation can refer to user controlled, autopilot and other instances of unmanned aerial vehicle flights.

As also further described herein, the aerial capture platform includes features that allow for understanding presence in places of operation. The features may be enabled from data captured by sensors on the aerial vehicle and analyzed on the aerial vehicle and/or remotely from it (e.g., the remote controller). Understanding presence may include, for example, detection of obstacles, restricted locations, no land zones, etc.

The aerial vehicle may include a mounting structure that couples with a camera and can secure it. The mounting structure can be removably attachable from the aerial vehicle 110. The mounting structure may include a gimbal to couple with the camera, which can assist with stabilization for image capture. Moreover, the camera can be configured so that it may be removably attachable from the mounting structure and can operate as a standalone camera. The camera and mounting structure may also be compatible with other mounting solutions, for example, a handheld (or portable) handle, pole, sports board mount, etc. In some example embodiments, the aerial vehicle may include an integrated camera. The integrated camera also may incorporate a gimbal.

As disclosed herein the aerial capture platform is designed and configured to capture images from an aerial vehicle perspective. For ease of discussion, reference herein will be made to images but it should be understood that such reference to images may include any media, e.g., video, still images, and/or audio, without limitation. The aerial capture platform configuration allows for a content creation platform that can be integrated with other camera and camera-related systems and ecosystems, such as activity cameras (e.g., a GOPRO HERO camera) and their ecosystems.

The aerial capture platform as disclosed herein is configured so that it may be content-focused image capture. The images may be captured without the user physically holding a camera. For example, the aerial vehicle may capture content from high above the ground or water, or some distance from the focal point of an object, e.g., a user riding a bike or surfing a wave.

The aerial capture platform as further described herein may be configured to provide ease of use so that the aerial vehicle can be flown within a relatively short time (e.g., minutes) of being unpacked. The aerial capture platform may be configured with mechanical structures that are easy to position and include intuitive hardware and software interfaces.

The aerial vehicle itself is portable. Portability is achieved through removable components such as propellers, arms, landing gear, battery, and/or size reduction features such as folding arms, folding landing gear, antenna system internal to the housing, etc. These features allow the aerial vehicle and corresponding components of the aerial capture platform to be structured for storage within a compact case or enclosure having a relatively small volume, for example, 20 liters to 30 liters.

The remote controller of the aerial capture platform can be configured for use in operating the aerial vehicle. The remote controller can be a dedicated mobile computing device or another mobile computing device, for example, a smartphone, a tablet, notebook computer, etc. By way of example, a dedicated remote controller can be configured to include a visual screen (e.g., liquid crystal display or plasma). In addition, the remote controller can include mechanical and/or solid state control elements, e.g. a joystick, touchpad, etc. The remote controller itself can be portable and contained within a casing (or housing). For example, the remote controller may include two parts, such as a display portion and control portion, that fold into each other. An antenna system can be configured within the casing of the remote controller to further enhance portability. The remote controller can be primarily dedicated for use with the aerial vehicle and can include its own operating system (e.g., an ANDROID based OS).

Also disclosed are various example embodiments of applications for use in conjunction with the aerial vehicle as well as with the remote controller. For example, disclosed is a configuration for programming a flight route for the aerial vehicle. In another example, disclosed is a configuration to monitor electrical, mechanical, and environmental data collected from sensors to determine whether any adjustments for a flight route should be applied. The collected data from the sensors may be used to automatically apply adjustments or executing an instruction to perform specific operations, e.g., have the aerial vehicle return to a predefined location. This example configuration includes automating the process of flight adjustments and returns so that the remote controlled aerial vehicle can operate with minimal to no impact on its immediate surroundings. Other examples are described herein.

Additional Examples for Configuration Overview

Also disclosed are additional examples for a configuration for a structure and/or operation for an unmanned aerial vehicle. For example, an aerial vehicle may include a housing having a gimbal attachment. The gimbal attachment may include a releasable mechanical lock to releasably couple a gimbal and including a connection electronics for communicatively coupling the gimbal coupled to a camera. The aerial vehicle may include a plurality of first arms. A first end of each first arm rotatably may couple with the housing towards a first portion of the housing. A second end of each first arm may include a motor. A first arm of the plurality of first arms may have its second end in a different elevational plane than the second end of a second arm of the plurality of first arms. The aerial vehicle may include a plurality of second arms. A first end of each second arm may rotatably couple with the housing towards a second portion of the housing. A second end of each second arm may include a motor. A first arm of the plurality of second arms may have its second end in a different elevational plane than the second end of a second arm of the plurality of second arms. A landing gear may have a plurality of foldable legs. The landing gear releasably coupled with an underside of the housing.

There may be other example structural features of the aerial vehicle. For example, the aerial vehicle may have a weight of between 1 kilogram and 2 kilograms. Continuing with examples, the first end of each of the plurality of first arms and the first end of each of the plurality of second arms may couple with an electronic sensor. The electronic sensor may be configured to detect whether a first end of an arm of the plurality of first arms or the plurality of second arms is in an open and locked position. The electronic sensor may be configured to detect whether a first end of an arm of the plurality of first arms or the plurality of second arms is in closed position. The landing gear may have electronics to automatically actuate pivot points coupled with the foldable legs to retract towards a bottom of the housing and extend away from the bottom of the housing. A propeller releasably coupled with the motor. The propeller may have a diameter of about 10 centimeters. The housing of the aerial vehicle may house a parachute. The plurality of arms of the aerial vehicle may include a foam floatation structure. The plurality of arms of the aerial vehicle may include a balloon floatation structure. The balloon floatation structure further may include a compressed air cartridge. The balloon floatation structure may include a sensor to detect water.

The process of generating may include powering light emitting diode (LED) on the aerial vehicle, the LED corresponding to an operational error. Alternately, or in addition, it may include a notification that includes an audible signal. Alternately, or in addition, the process for generating the notification may include transmitting a message to a remote controller. The message may correspond to the arms being in the unlocked position. The process may for disabling the flight mode may include disabling power to a thrust motor electronics. Alternately or in addition, the process for disabling control signals may be received from a remote controller.

Also disclosed is process (or method) for performing systems check on an aerial vehicle. The process may be embodied as instructions stored on a non-transitory computer readable storage medium. The instructions corresponding to the process may be executable by a processor. The process may receive data from a sensor. The sensor may be communicatively coupled with a plurality of foldable arms of an aerial vehicle. The data may indicate position of the plurality of foldable arms. The process may detect from the data that a foldable arm of the plurality of foldable arms is in an unlocked position. The process may disable a flight mode of the aerial vehicle in response to the detection. The process may generate a notification in response to the disabled flight mode.

Also disclosed is a process of tracing a pre-flight path of an aerial vehicle. The process may be embodied as instructions stored on a non-transitory computer readable storage medium. The instructions corresponding to the process may be executable by a processor. The process may retrieve, from a storage of a trace device, traced route data corresponding to a traced route. The traced route data may comprise a plurality of positional coordinates captured by a positional sensor of the trace device. The positional coordinates may include start coordinates, intermediate coordinates, and end coordinates. The process may map the start coordinates, the intermediate coordinates, and the end coordinates of the traced route data onto an overlay map. The process may paint, onto the overlay map, additional information corresponding to the traced route. The process may generate, from the overlay map, aerial flight route data for flight of the aerial vehicle.

Also disclosed is a flight control system. The system may include a route planning module, configured to execute a flight route for an aerial vehicle. The may include a systems check module configured to monitor operational systems of the aerial vehicle when the aerial vehicle is in flight mode. The system may include a control module configured to control operation of the aerial vehicle when the aerial vehicle is in flight mode. The system may include a tracking module configured to track informational data when the aerial vehicle is in the flight mode. The system may include a tracking database to store the tracked informational data.

Also disclosed is a process to control automatic return of an aerial vehicle. The process may be embodied as instructions stored on a non-transitory computer readable storage medium. The instructions corresponding to the process may be executable by a processor. The process may include tracking a flight path of the aerial vehicle. The process may include generating a clear path from the tracked flight path. The process may include monitoring one or more sensors during flight of the aerial vehicle for detection of a predefined condition. The process may include detecting whether the predefined condition has been met. The process may include loading a return path program into a memory of the aerial vehicle in response to the detected predefined condition being met, the return path program retrieving the clear path. The process may include executing the return path program on the aerial vehicle to automatically navigate the aerial vehicle to a return location using the clear path.

Also disclosed is a process to control automatic return of an aerial vehicle. The process may be embodied as instructions stored on a non-transitory computer readable storage medium. The instructions corresponding to the process may be executable by a processor. The process may store a return location in a storage device of the aerial vehicle. The return location may correspond to a location where the aerial vehicle is to return. The process may monitor one or more sensors during flight of the aerial vehicle for detection of a predefined condition. The process may detect whether the predefined condition has been met. The process may load a return path program into a memory of the aerial vehicle. The return path program may provide a return flight path for the aerial vehicle to automatically navigate to the return location. The process may execute the return path program on the aerial vehicle in response to the detected predefined condition being met. The process may detect an obstacle during the flight of the aerial vehicle. The process may store obstacle data corresponding to the detected obstacle. The process may modify the return path program based on the obstacle data for avoidance of the detected obstacle by the aerial vehicle in the return flight path during the execution of the return path program. The process may limit execution of control signals received from a remote controller. The process may determine whether the return location comprises a no land zone. The process may transmit to a remote controller that the return location is a no land zone. The process may receive from the remote controller a new return location to replace the stored return location. The process may determine whether the return location comprises a no land zone. The process may receive, in response to the determination that the return location comprises a no land zone, a new return location to replace the stored return location. The no land zone may be a body of water or a highway. The predefined condition may be a structural condition of a mechanical component, an operational condition of an electronic component, an airspace restriction, and/or a weather condition.

Example System Configuration

The descriptions herein are in the context of a remote controlled aerial vehicle, for example, a rotary wing (or rotary blade) or fixed wing aircraft. However, disclosed configurations may apply to other remote controlled vehicles such as boats and cars. In addition, the remote controlled vehicles may have hobby sized form factors. As noted above remote control aerial vehicles may sometimes be referred to as unmanned aerial vehicles or drones and in this context may include camera units/hardware for capturing images.

Turning now to Figure (FIG. 1, it illustrates an example aerial capture platform (or system) 100. The aerial capture platform 100 may include a remote controlled aerial vehicle 110 in communication with a remote controller 120. The aerial vehicle 110 and the remote controller 120 are communicatively coupled through a wireless link 125. The wireless link 125 can be a Wi-Fi link, cellular (e.g., long term evolution (LTE), 3G, 4G, 5G) or other wireless communication link. In this example of the aerial capture platform 100, the aerial vehicle 110 can be, for example, a quadcopter or other multi-rotary blade aerial vehicle. Also in this example, the remote controller 120 is illustrated as a dedicated remote controller, but the principles described herein can apply to other devices that may operate as a remote controller, for example, a smartphone, tablet, a laptop, etc.

The aerial vehicle 110 in this example includes a housing (or body) 130, a gimbal 210, two or more arms 135, and two or more propellers 140. The housing 130 has one or more cavities for a payload. The payload can include, for example, electronic circuitry (including, e.g., controls and processing components), battery, sensors, etc. The payload may include mechanism such as a parachute. The parachute may be in a portion of the housing that can open so that the parachute can deploy in certain pre-determined situations. The parachute and/or corresponding portion of the housing 130 may couple with electronics that can provide the logic for deployment of the parachute. The housing 130 may include a communication subsystem (which may include corresponding electronics and/or firmware) and a control subsystem (which may include corresponding electronics and/or firmware). The communication subsystem may be used to wirelessly communicate with a remote controller, e.g., 120, or other interfaces on the aerial vehicle 110. The control subsystem may be configured to control operations of various systems on the aerial vehicle 110 such as the power system, the flight operation system and other such system. The communication subsystem and the control subsystem are described further in detail with respect to FIG. 3.

The gimbal 210 may be a removable structure. For example, the gimbal 210 may removably (or releasably) mount within an opening on the housing 130 of the aerial vehicle 110. Further by example, when removed from the aerial vehicle 110, the gimbal 210 may be mounted on another structure, for example, a pole mount. The gimbal 210 may couple with a removable camera frame. Alternately, the gimbal 210 may be integrated with the housing 130. The gimbal 210 also may include a camera secured directly with it or through the camera frame. The camera frame can be removed and fitted for the particular camera that couples with it. Alternately, the camera frame may be integrated with the gimbal.

Each arm 135 of the aerial vehicle 110 can removably couple with the housing 130. In addition, each arm 135 includes a thrust motor 240 (which may include a rotor) that can mechanically, and removably, couple with a propeller 140 to create a rotary assembly. When the rotary assembly is operational, all the propellers 140 spin at appropriate directions and/or speeds to allow the aerial vehicle 110 to lift (take off), tilt, turn, land, hover, and/or otherwise move (up, down, forward, reverse (or backward), etc.) in flight.

The aerial vehicle 110, including gimbal 210, and remote controller 120 are further described herein. Also described are some example operational configurations for each.

Remote Controlled Aerial Vehicle

Beginning with the remote controlled aerial vehicle 110, reference is now made to FIGS. 2A-2E. By way of example, at a high level the aerial vehicle 110 may include the housing 130, arms 135, thrust motors 240, propellers 270 and landing gear 272.

In the example of the aerial vehicle 110, the arms 135 couple with the housing 130. A thrust motor 240 couples with each end of an arm 130, and this may form an arm assembly. Further, a propeller 270 may couple with each thrust motor 240. The thrust motor 240, when coupled with the propeller 140 (shown in FIG. 2B), spins the propeller in an appropriate direction when the thrust motor 240 is operational.

The arms 135 are configured so they can pivot about their connection point at the housing 130. For example, the arms 135 can be extended away from the housing for purposes of flight and can be folded back so the arms are close to the housing 130, for example, for storage or transport (e.g., as shown in FIG. 2C). In addition, each of the arms 135 is removably coupled with the housing 130 so that they can be removed and/or replaced, for example, in the event of wear, breakage, structural compromise, or new designs. In addition, propellers 270 that couple to motors 240 on the end of each arm 135 are removable also, for example, for storage and/or replacement. Additionally, the arms 135 may incorporate connection electronics (e.g., electrical/electronic circuitry and/or components) and/or mechanical structures to extend or fold the arms automatically.

In example embodiments in which the arms 135 rotatably couple the housing 130 of the aerial vehicle, there may be a sensor and/or connection to a sensor (or sensor system) that may be used to determine if the arms 135 are in a closed position or in an open and locked position (e.g., for flight of the aerial vehicle 110). If the aerial vehicle 110 is preparing to fly and any one arm is not properly in an open, locked position, a notification may be generated. Examples of notification include powering a light emitting diode (LED) that may be a warning light, generating an audible signal (e.g., a beep, an alarm or voice notification) or transmitting a message to another device (e.g., the remote controller). In some embodiments, power to the motors of the arm (or arms) that is not properly open and locked may be cut off (disabled). In some embodiments control signals received from the remote controller may be disabled.

The housing 130 of the aerial vehicle 110 can be configured to be waterproof to reduce and/or eliminate water or dust from entering the internal cavity of the housing 130 where electrical components are housed. For example, rubber gaskets can be structured around locations such as where the arm 135 connects with the housing 130 or moves to fold against the housing. Moreover, the aerial vehicle 110 is configured to allow incorporation of, or couple with, float structures made of, for example, removable foam, fiberglass, balloon, or other material that is structured to allow the aerial vehicle 110 to float in the event of a water landing. A further example of a foam floatation structure may be a dense foam that enables floatation on water and may be wrapped around or substantially around an arm of the aerial vehicle 110 and/or the housing of the aerial vehicle 110. A further example of a balloon floatation structure may include having the balloon within an arm or around an arm of the aerial vehicle. The balloon may be coupled with an air assembly, e.g., compressed air cartridge. The air assembly may be configured to inflate the balloon upon a signal from an external source, e.g., the remote controller 120, configured to trigger (or activation) a switch to release the air from the compressed air cartridge into the balloon. Alternately, the air assembly may be configured to inflate the balloon or upon a sensor on the aerial vehicle 110 detecting water and triggering (or activating) the switch to release the air from the compressed air cartridge into the balloon.

The float structures, in addition to being removably coupled with the housing 130, also are configured to be aerodynamic to reduce wind drag during flight. Further, the arms 135 also may include optional removable floatation structures that assist with overall buoyancy of the aerial vehicle 110 in the event of a water landing or independently can float if they separate on from the housing 130 and land on water.

Figure 2A:
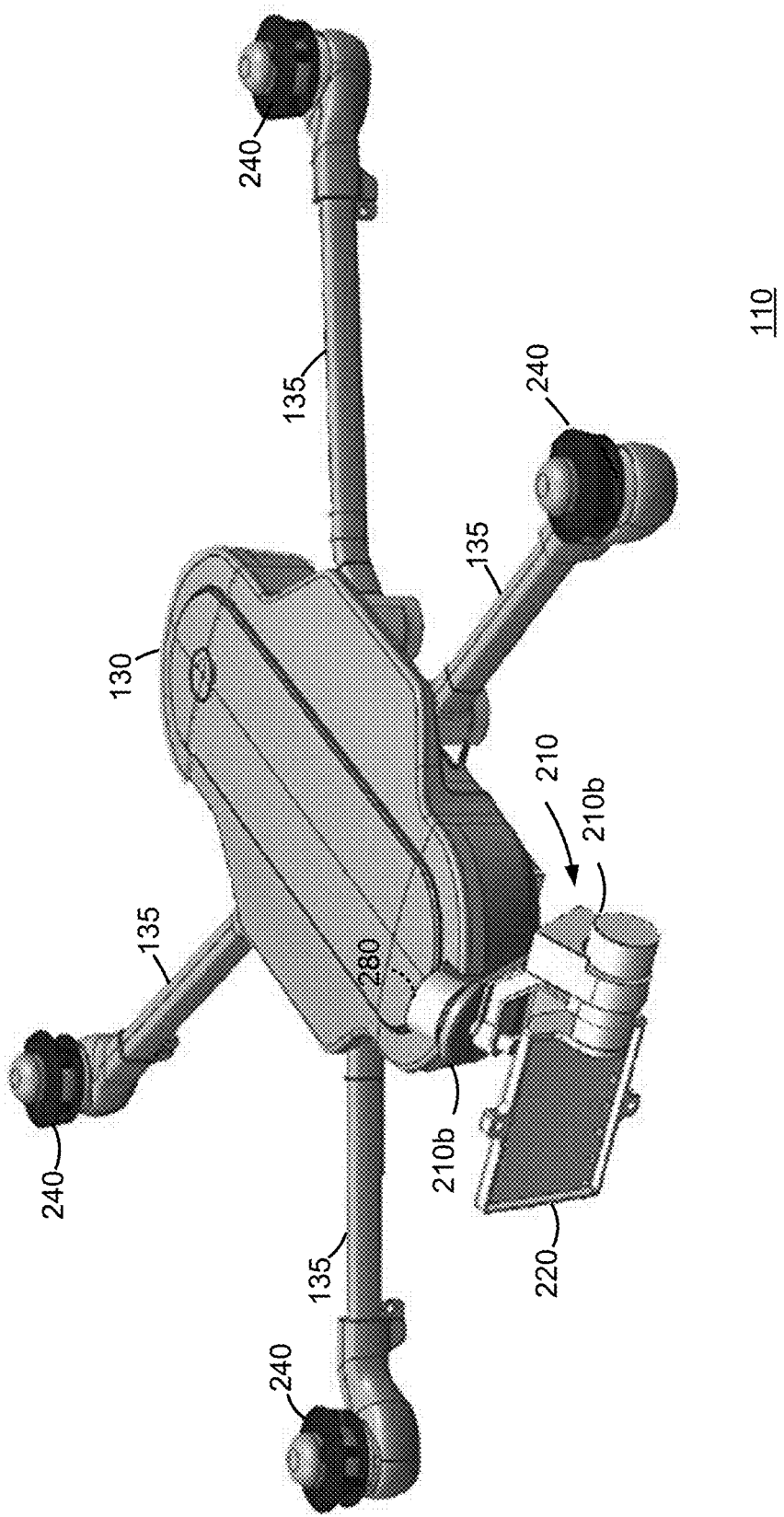
FIG. 2A illustrates an example of a remote controlled aerial vehicle.
Figure 2B:
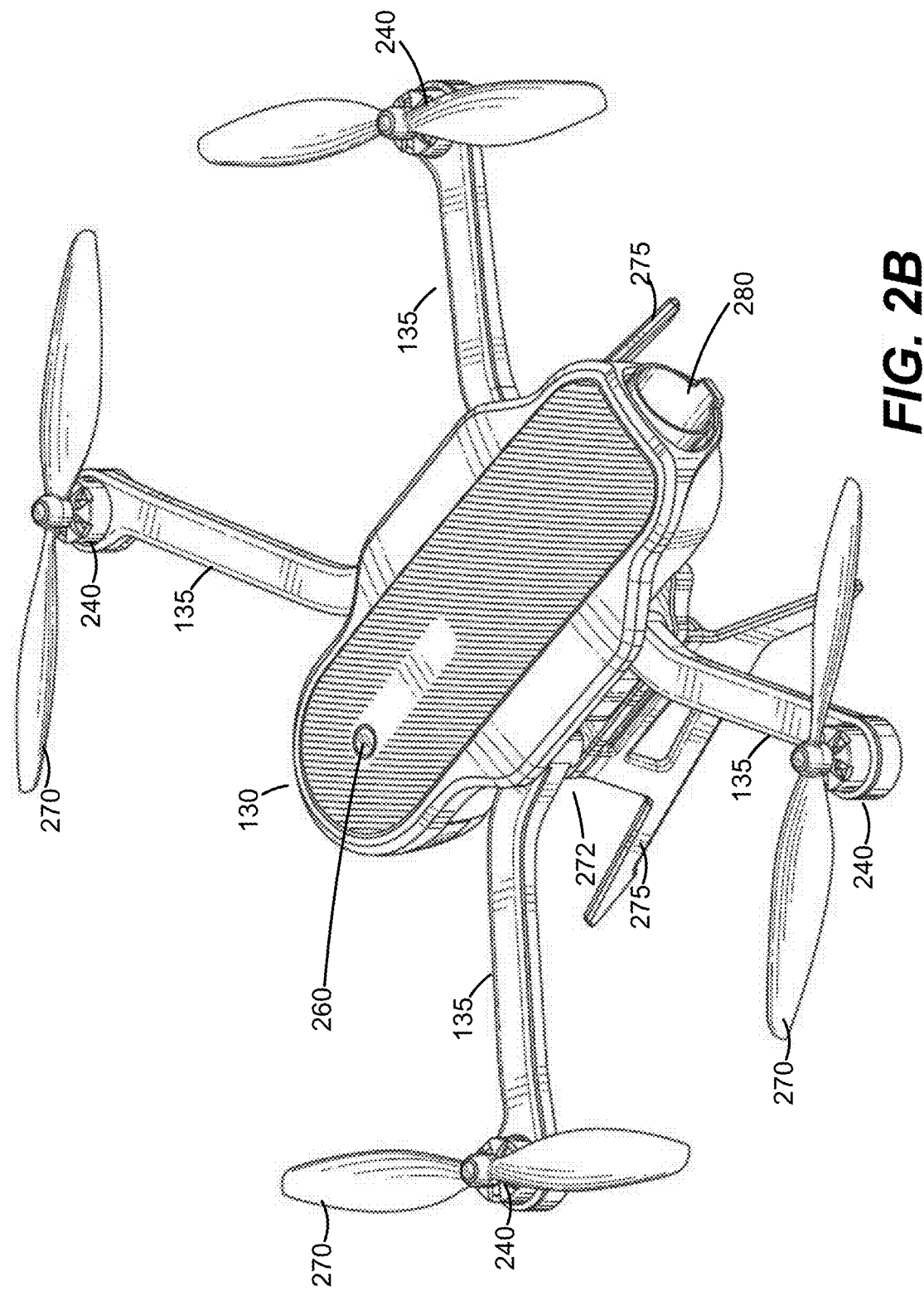
FIG. 2B illustrates an example of an aerial vehicle in an open position.
Figure 2C:
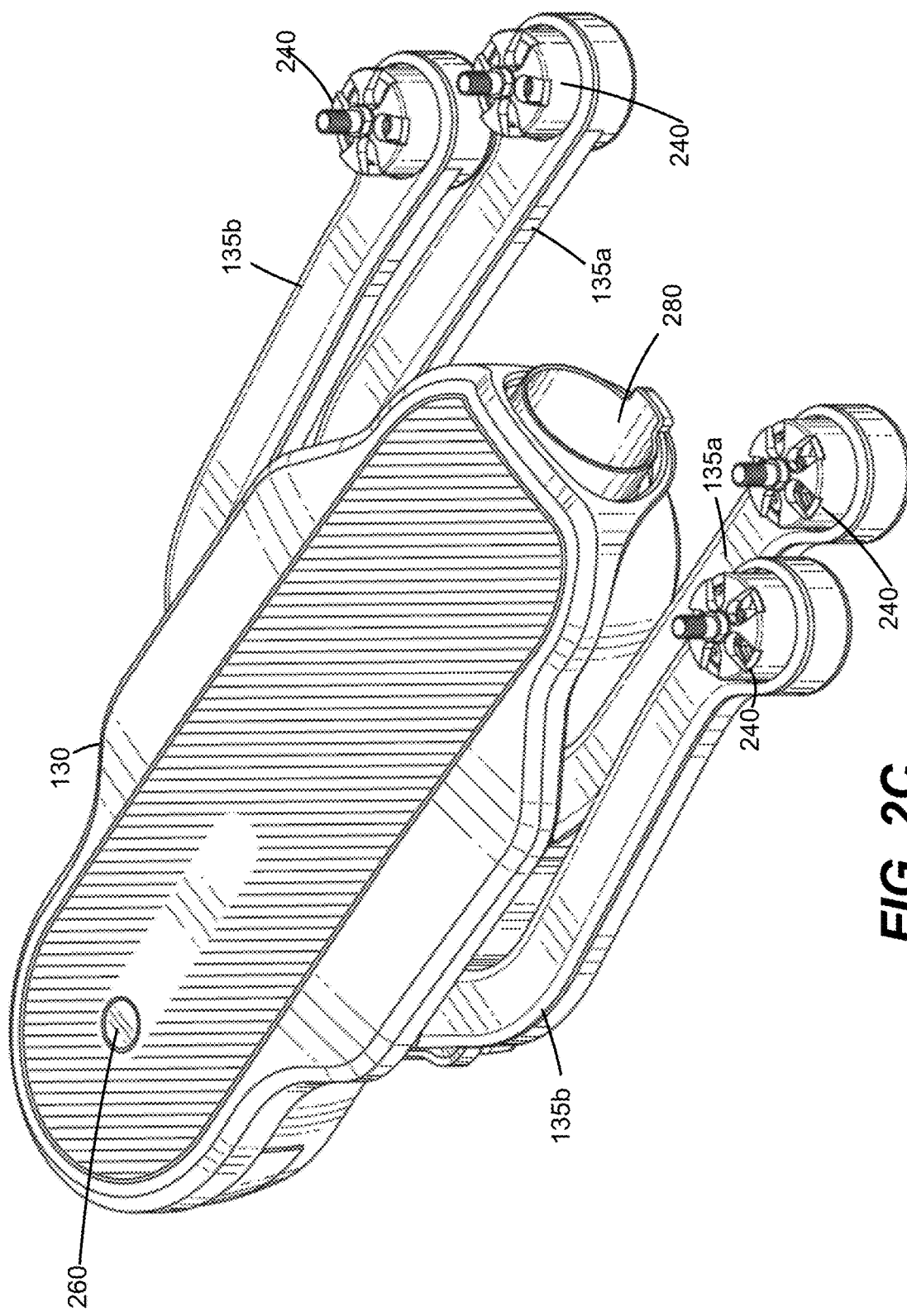
FIG. 2C illustrates an example of an aerial vehicle in a closed position.

Turning now to further descriptions of configurations of the aerial vehicle 110, FIG. 2B illustrates an example of the aerial vehicle 110 in an open position (or state). This example embodiment of the aerial vehicle 110 illustrates the housing 130, removably foldable arms 135, removable landing gear 272 (further described below), and the rotors 240. Also shown is a start button 260 along a top of the housing 130. The start button 260 can be used to place the aerial vehicle 110 in different operating states—e.g., ON, OFF, or STANDBY. Also shown is a gimbal opening 280, further described below.

FIG. 2C illustrates an example of the aerial vehicle 110 in a closed (folded) position (or state) and the propellers 270 removed. In the closed position illustrated, the landing gear 275 can be folded under the housing 130 and/or decoupled from the housing 130, e.g., for separate storage. Further, propellers 270 have been decoupled from the motors 240, e.g., for separate storage. In addition, the arms 135 are shown folded against the housing 130 of the aerial vehicle 110. In this example, the structural elements of the arms 135 help enhance portability of the aerial vehicle 110 in a closed position by providing a compact footprint. For example, the arms on the same side couple with the housing 130 such that when the arms are folded they are in a nested position relative to each other with rear arms substantially parallel with the front arms. Continuing with the example, a first set of arms (e.g., front arms) 135a may have a lower elevational plane (e.g., "z-axis" plane) than a second set of arms (e.g., rear arms) 135b, as further illustrated with FIGS. 2D and 2E, or vice versa. This offset can further help create a compact footprint in the closed position as at least a portion of the second arm may overlap with a portion of the first arm on its respective side in the nested position.

Figure 2D:
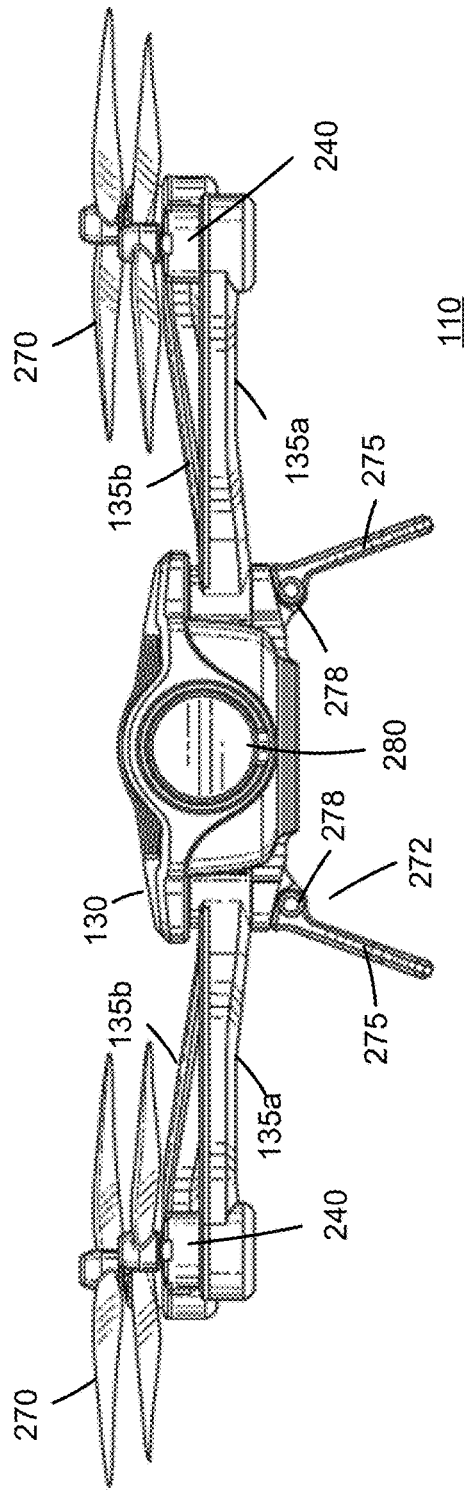
FIG. 2D illustrates an example of an aerial vehicle from a first end view.
Figure 2E:
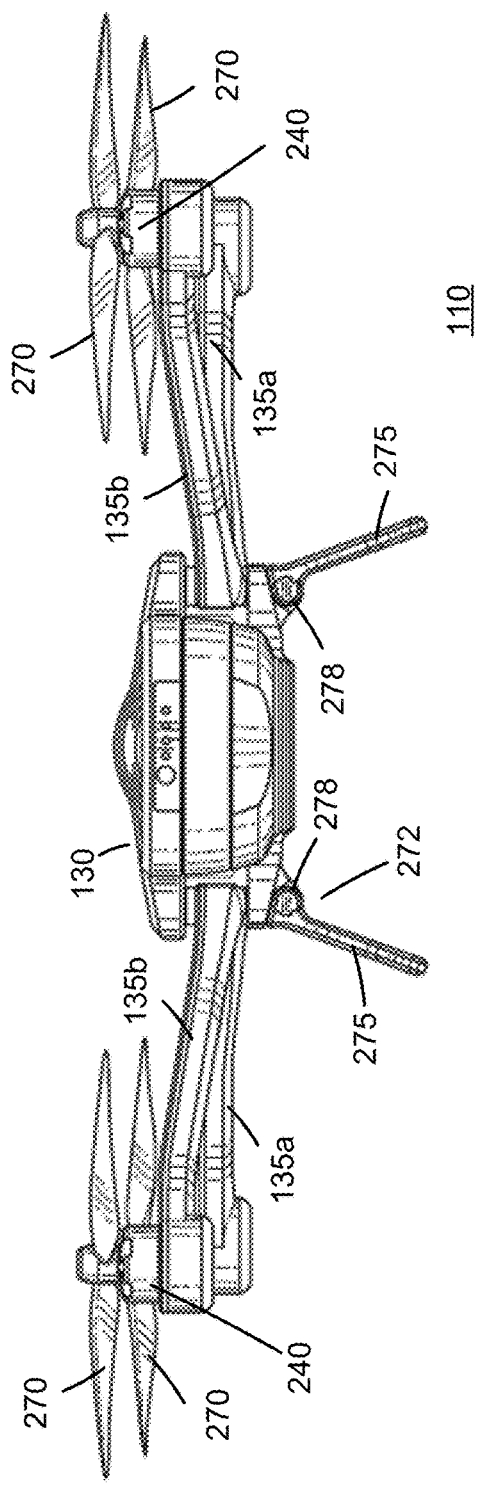
FIG. 2E illustrates an example of an aerial vehicle from a second end view.

FIG. 2D and FIG. 2E illustrate additional views of the aerial vehicle 110. FIG. 2D illustrates a first end view, e.g., where the gimbal opening 280 is located. FIG. 2E illustrates a second end view, e.g., opposite end of where the gimbal opening 280 (e.g., gimbal attachment mechanism) is located. The gimbal opening 280 is further described below.

In FIGS. 2D and 2E, the first set of arms 135a are shown to be in a lower elevational plane (e.g., "z-axis" plane) along a portion of the arm than the second set of arms 135b, which are in a higher elevational plane. As previously noted, this configuration helps allow the arms (generally 135) to be closer to the housing 130 when the arms are rotated into a folding position, as further shown in FIG. 2C. Moreover, as each arm 135 can be a unibody construction. Unibody construction can help maintain structural rigidity and integrity by limiting potential break points while still providing a compact footprint.

The aerial vehicle 110 also includes removable landing gear 272. The landing gear 272 can have two or more legs 275 (or arms). The legs 275 are what the aerial vehicle 110 rests upon when on the ground, e.g., prior to flight, at landing, etc. The landing gear 272 may be removably coupled with a bottom of the housing 130. In addition, the legs 275 of the landing gear 272 can be folded flush or substantially flush against the bottom of the housing 130.

FIGS. 2D and 2E illustrate the landing gear 272. The landing gear 272 includes two pivot points 278 about which the legs 275 rotate to fold inward toward the bottom of the housing 130. The landing gear 272 can be configured so that it fits within a recessed cavity of an underside, or bottom, of the housing 130. The recessed cavity can allow the legs 275 in the folded position to be substantially flush with the bottom of the housing 130 to further enhance portability by tucking the legs 275 within the overall aerial vehicle 110 volumetric footprint rather than having them remain apart from bottom of the housing 130 of the aerial vehicle 110. The legs 275 of the landing gear 272 may be removable from the rest of the landing gear 272. The legs 275 may be removed, for example, for storage, and/or replaced as needed, e.g., due to wear, tear, structural compromise, or updated structural configuration.

The landing gear 272 and/or its legs 275 may include optional removable flotation structures (e.g., foam or balloon) that assist with overall buoyancy of the aerial vehicle 110 in the event of a water landing or independently can float if they separate from the housing 130 and land on water. Moreover the landing gear 272, including the legs 275, may be made of a structurally rigid, yet buoyant material that can hold the weight of the aerial vehicle 110 when on the ground resting, and help with floatation in the event of a water landing.

The landing gear 272 may incorporate electronics and/or mechanical structures to extend and retract the legs 275 of the landing gear automatically. The electronics may have electrical connection points where the landing gear 272 can couple with the bottom of the housing. By way of example, the electronics may control the pivot points 278 to retract the foldable legs 275 toward a bottom of the housing 130 or extend away from the bottom of the housing 130. By way of operational example, when the aerial vehicle 110 is at a predetermined distance from the ground (e.g., as detected from a proximity sensor on the aerial vehicle), the legs may be retracted during ascent (or lift off). When the aerial vehicle 110 is descending to land, when the aerial vehicle reaches a predetermined distance from the ground, the legs may be extended. Alternately, or in addition, the remote controller 120 may be used to transmit control signals to the aerial vehicle 110 to retract or extend the legs 275 of the landing gear 272.

Removable Gimbal

Referring back to FIGS. 2A-2D, shown is the previously introduced gimbal opening 280, which is integrated with the example embodiment of the aerial vehicle 110. The gimbal opening 280 may be configured to receive a gimbal 210. The gimbal opening 280 comprises a cavity that may include a releasable lock mechanism to receive an end of a gimbal 210 and securely connect (or couple) it relative to the aerial vehicle 110. The coupling is such that the gimbal 210 can remain fixedly connected during flight. As the lock is releasable, the gimbal 210 can be disconnected (or decoupled) from the aerial vehicle 110 when desired. A portion of the gimbal opening 280 against the housing 130 may be sealed with a rubber gasket to assist with creating a water and/or dust barrier.

The gimbal 210, when connected with the gimbal opening 280, may be configured to allow for rotation of an object about an axis. The object in one example may be a camera mount 220. The gimbal 210 allows for the camera mount 220 to maintain a particular position so that the camera mounted to it can assist with providing image stability and a consistent horizon view (a horizontal plane as may be predefined or defined by a user) or view relative to the horizon as the aerial vehicle 110 is in flight. The camera mount 220 may be, for example, a plate or a frame. In addition to allowing a camera (not shown in FIG. 2A) to couple (e.g., attach) to it, the camera mount 220 may include electrical connection points for the coupled camera. The electrical connection points can be used to power the camera and/or communicate signals between the camera and the gimbal 210 and/or components of the aerial vehicle 110.

The gimbal 210 can, in some example embodiments, be an electronic three-axis gimbal which rotates a mounted object (e.g., camera mount 220, which may be a detachable camera frame connected to a camera) in space. Each axis of the gimbal 210 includes a motor (e.g., 210a, 210b) to control rotation. The gimbal 210 may include an electrical connection with a power subsystem of the aerial vehicle 110 to power the motors (e.g., 210a, 210b) or may include its own battery power supply. The gimbal may include connection electronics to provide part of an electronic connection between the camera and the aerial vehicle 110. The gimbal may include a sensor unit and a control logic unit, both of which are part of a gimbal control system. The gimbal control system can detect the orientation of the gimbal 100 and camera, determine a preferred orientation of the camera, and control the motors of the gimbal in order to re-orient the camera to the preferred position.

A sensor unit within the gimbal can include an inertial measurement unit (IMU) which measures rotation, orientation, and acceleration using sensors, such as accelerometers, gyroscopes, and magnetometers. The sensor unit can contain rotary encoders, which detect the angular position of the motors of the gimbal 210, and a magnetometer to detect a magnetic field, such as the earth's magnetic field. In some embodiments, the sensors of the sensor unit are placed such as to provide location diversity. For example, a set of accelerometers and gyroscopes can be located near the camera (e.g., near the connection to the detachable camera frame) and a set of accelerometers and gyroscopes can be placed at the opposite end of the gimbal (e.g., near the connection to the aerial vehicle 110). The outputs of these two sets of sensors can be used by the IMU to calculate the orientation and rotational acceleration of the camera, which can then be output to the gimbal control logic. In some embodiments, the sensor unit is located on the aerial vehicle 110. In some embodiments, the gimbal control logic receives data from sensors (e.g., an IMU) on the aerial vehicle 110 and from the sensor unit of the gimbal 210.

In one embodiment, the gimbal 210 is removable from the camera mount 220 and structured for use with other devices, for example, a mount platform such as a tripod, a handheld grip, or an intelligent base. A mount platform also can removably couple with the gimbal 210. By way of example, the mount platform (e.g., handheld grip) can include a plurality of buttons, which can be used by a user to control the camera and/or the gimbal 210. Note that some mount platforms, e.g., handheld grip, may contain a battery from which it can provide power to the gimbal 210 and may also be used to power and/or charge the camera in addition to operating any electronic functions on the handheld grip itself. It is noted that the mount platform can have controls and circuitry for wireless communication with other computing devices.

Remote Controller

Referring next to the remote controller 120, FIGS. 2F to 2I illustrate one example embodiment of the remote controller 120. The remote controller 120 in this example includes a first control panel 150 and a second control panel 155, an ignition button 160, a return button 165 and a display 170. It is noted that more or less control features and buttons may be included. In this example, the remote controller 120 can be used to control operation of the aerial vehicle 110. This operation can include pitch, roll and yaw control for the aerial vehicle 110 in addition to other functions.

Continuing with the example, the control panels 150, 155 can be used by a user to initiate control operations. The control panels can be mechanical (e.g., joystick, roller ball, etc.) or solid state (e.g., touch pad). For example, a first control panel 150 can be used to control "up-down" direction (e.g. lift and landing) of the aerial vehicle 110. A second control panel 155 can be used to control "forward-reverse" (e.g., thrust/drag) direction of the aerial vehicle 110. In addition, a combination of the panels 150, 155 with another controller mechanism, e.g., a wheel, can be used for "left-right" and/or hover movement. It is noted that these are just examples and that the controllers can be assigned other or different functions.

The ignition button 160 can be used to remotely turn on and/or start (as well as turn off or pause operation of) the aerial vehicle 110 components. For example, a single press of the ignition button 160 may start operation of a first set of components, e.g., sensors and lighting, on the aerial vehicle 110 and a second press may start operation of a second set of components, e.g., the rotary assembly (e.g., start the propellers 140), on the aerial vehicle 110. The return to home (RTH) (or come home) button 165 can be used to override the controls of the remote controller 120 and transmit instructions to the aerial vehicle 110 to return to a predefined location. Examples of a return to home configuration as a part of a return path will be described further below.

The ignition button 160 and the return button 165 can be mechanical and/or solid state press sensitive buttons. In addition, each button 160, 165 may be illuminated with one or more light emitting diodes (LED) to provide additional details. For example, the LED can switch from one visual state to another to indicate with respect to the ignition button 160 whether the aerial vehicle 110 is ready to fly (e.g., lit green) or not (e.g., lit red). The LED also can provide visual indicators corresponding to aerial vehicle 110 operation in flight, for example, if it is in an override mode on return path (e.g., lit yellow) or has a battery power level below a predefined threshold (e.g., lit green when above a first threshold, lit yellow when just below that threshold, and lit red below a lower threshold). It also is noted that the remote controller 120 may include other dedicated hardware buttons and/or switches and those buttons and switches may be mechanical and/or solid state buttons and switches. For example, another button may be added to transmit signals/instructions to the aerial vehicle to deploy the parachute.

The remote controller 120 may include dedicated buttons corresponding to functions on the remote controlled aerial vehicle 110, for example, a camera shutter button for signaling (or triggering) taking still or video images, changing image capture resolution, changing frame rate, etc. Other buttons can be used for functions such as camera controls, including control settings, for example, tagging images, transmitting (or sharing) captured images, etc.

The remote controller 120 may include a screen (or display) 170. The screen 170 provides for visual display. The screen 170 can be a touch sensitive screen. The screen 170 can be, for example, a liquid crystal display (LCD), an LED display, an organic LED (OLED) display, or a plasma screen, etc. The screen 170 allows for display of information related to the remote controller 120, for example, menus for configuring the controller 120 and/or remotely configuring the aerial vehicle 110, and/or controlling a camera and/or gimbal 210 coupled with the aerial vehicle 110. The screen 170 can display images captured from a camera coupled with the aerial vehicle 110.

The remote controller 120 in this example includes a two-part casing (or housing) that may be coupled via pivot points 291. The pivot points 291 may be a mechanical hinge. For example, a first part casing (or first casing) may include the screen 170. Further by example, a second part casing (or second casing) may include the control panels 150, 155, buttons 160, 165 and a speaker 293. Each casing may include a cavity to house electronics and/or sensors for the components noted. Within either or both portions of the casing there may be an internal antenna. The antenna also may be configured external to the casing or a combination of internal and external.

Figure 2I:
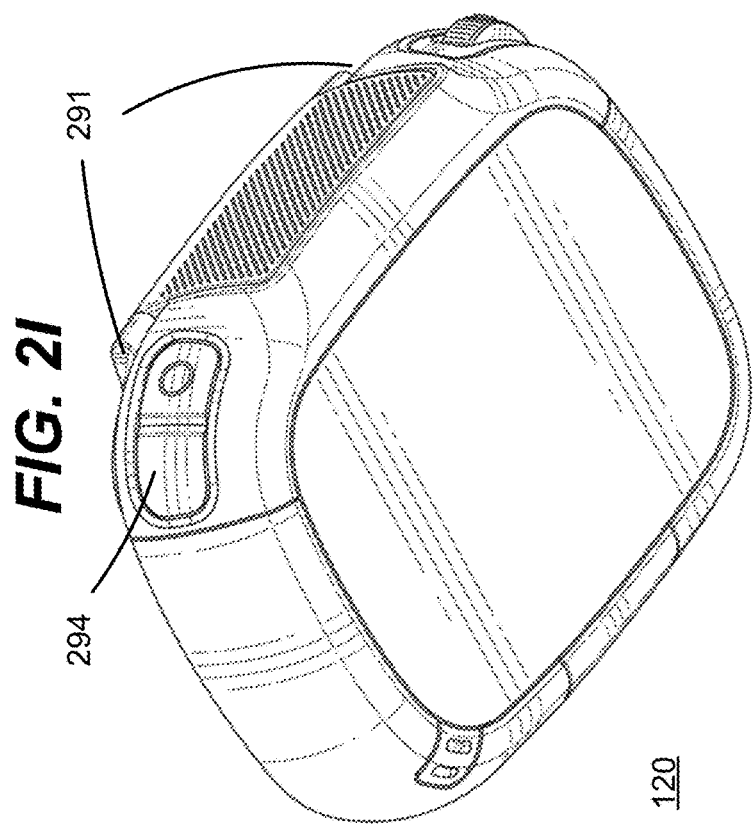
FIGS. 2H and 2I illustrate an example remote controller in a closed position.
Figure 2H:
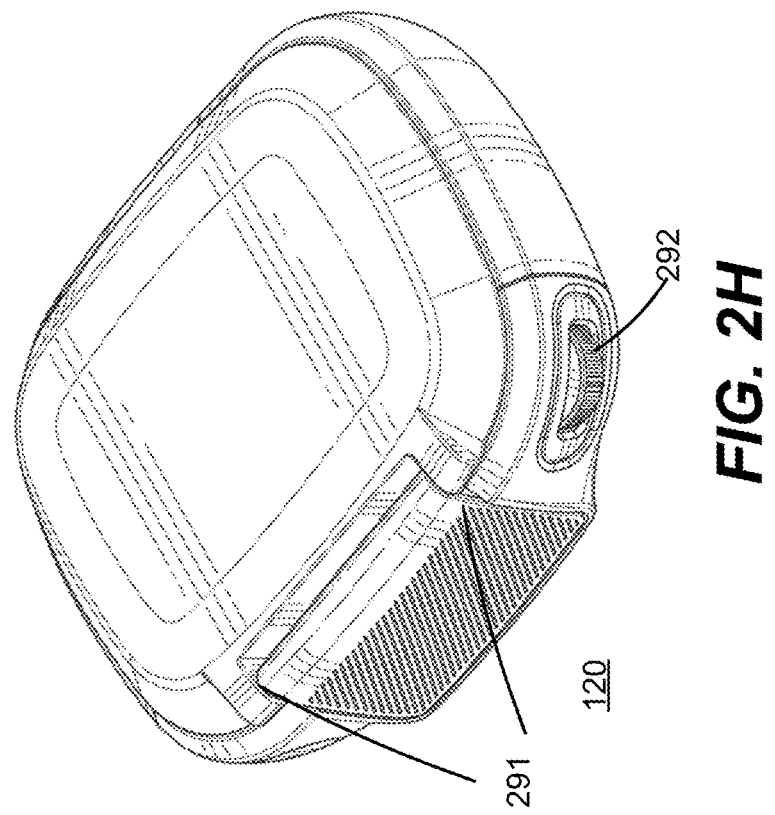

In the example configurations of FIGS. 2F and 2G, illustrated is the remote controller 120 in an open position. This example remote controller 120 shows a power button 290, pivot points 291, wheel 292 and a speaker 293. Here, the casing is illustrated in two portions, one with the screen 170 and one with the other components such as the control panels 150, 155, buttons 160, 165 and the speaker 283. Each in this example is individually enclosed. The two parts of the casing are coupled through pivot points 291. The pivot points 291 are points or ends about which the first casing having the screen 170 rotates to cover the second casing to form a "closed" state of the remote controller 120, as shown in FIGS. 2H and 2I.

In these example illustrations of the remote controller 120, the shown power button 290 may powers the remote controller 120 in an ON, OFF, or STANDBY state. The wheel 292 can be provide assigned functionality, for example, fine movements, "left or right" and/or hover movements. The speaker 293 may be used for audio playback through the remote controller 120. FIGS. 2H and 2I illustrate an example remote controller 120 in a closed position. FIG. 2I in particular also illustrates, by way of example, an additional switch 294, which can be assigned functionality, including, for example, power state, or locking, etc.

Example Electronics and Control System for Aerial Vehicle

Figure 3:
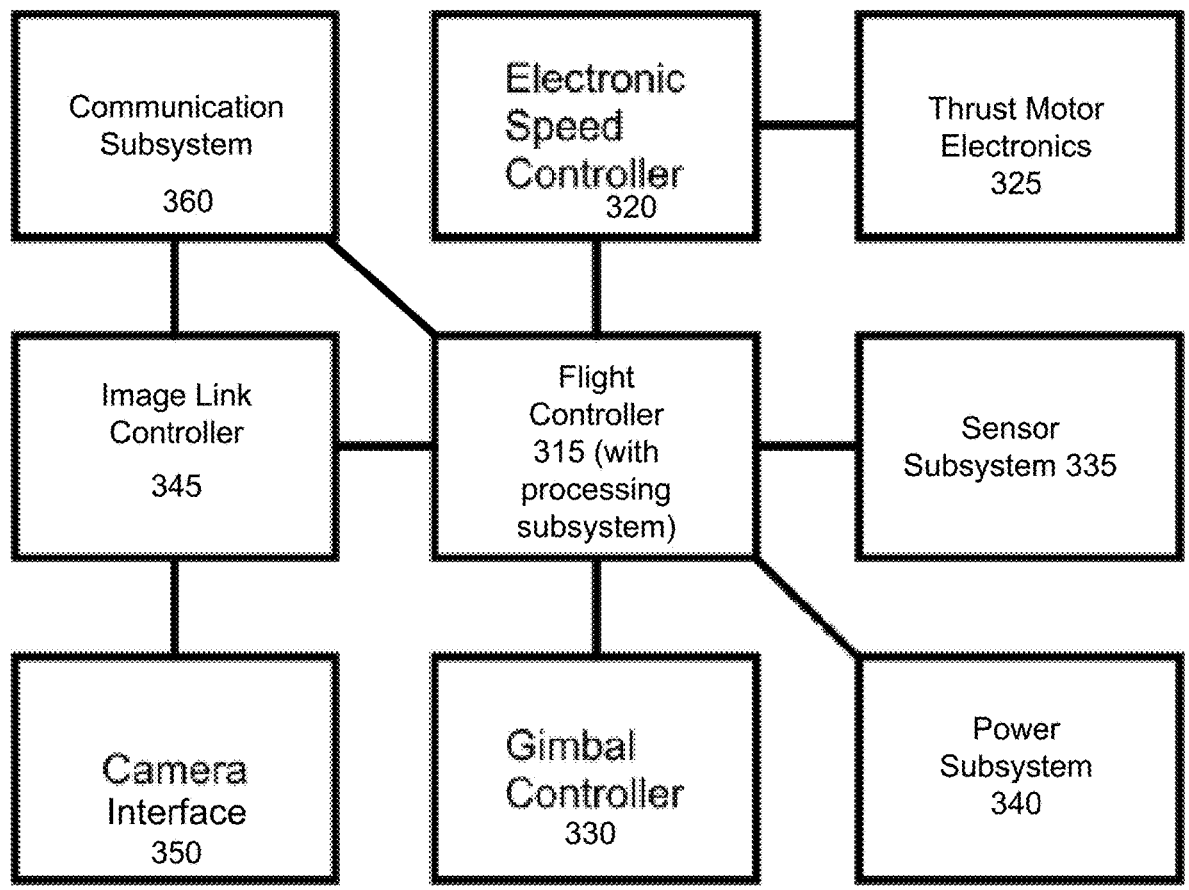
FIG. 3 illustrates an example of aerial vehicle electronics and control systems.

FIG. 3 illustrates an example embodiment of an electronics and control (EC) system 310 of the aerial vehicle 110. The example EC system 310 may include a flight controller 315, an electronic speed controller (ESC) 320, one or more thrust motors electronics 325, a gimbal controller 330, a sensor subsystem (which may include telemetric subsystems) 335, a power subsystem 340, an image link controller 345, a camera interface 350, and a long range communication subsystem 360. The components communicate directly or indirectly with each other through a data bus within the aerial vehicle 110.

Figure 14:
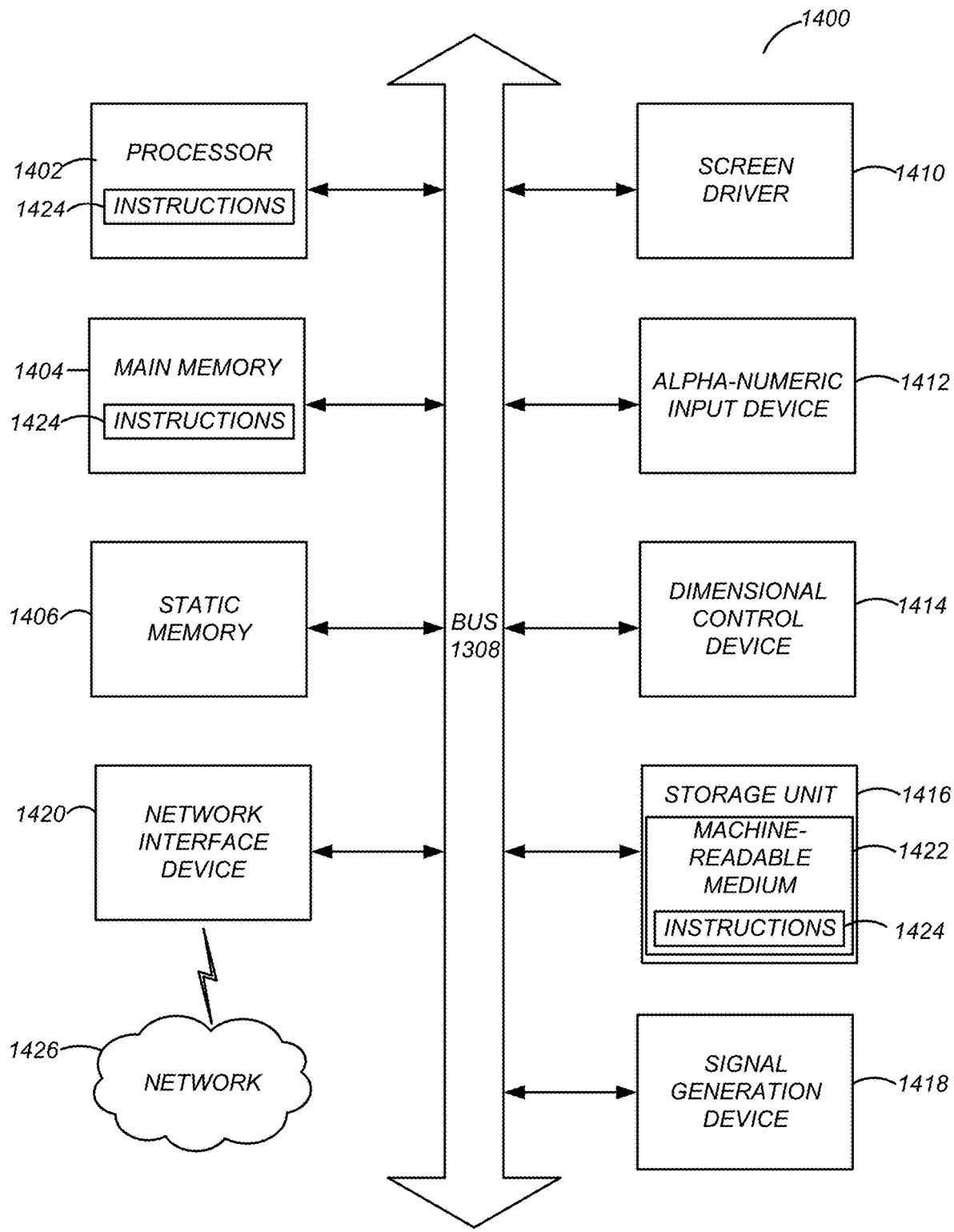
FIG. 14 illustrates an example machine for use with a system of an aerial vehicle.

The aerial vehicle 110 components may be embodied in hardware, software, or a combination thereof. The software, which can include firmware, may be referenced as program code, computer program product, or program instructions, and may be comprised of one or more instructions. Software may include an operating system, which provides an interface to a processor, and on which software applications run (or execute). Software can be executed by one or more processors within the aerial vehicle 110. A processor also may include, for example, controllers, application specific integrated circuits (ASICs) and/or field programmable gate arrays (FPGAs). The processor can be configured to execute the software in a specific manner. FIG. 14 provides an example machine architecture with a processor that can be configured to execute software. It is noted that not all the components of FIG. 14 may be included in the aerial vehicle 110. FIG. 14 is intended to be illustrative in describing an architecture of a computing system, of which all or parts can operate within the aerial vehicle 110 and the EC system 310.

In this example, the aerial vehicle 110 may be configured to include an aerial vehicle operating system (AVOS). By way of example, the AVOS can be built on an operating system kernel, for example, LINUX, and/or be based on an operating system such as ANDROID OS. The software components of aerial vehicle described in the disclosure operate with the AVOS. Examples of these software configurations are found throughout this disclosure.

Turning now to the example components of the EC system 310, a further description of each component is provided. In one example embodiment, the flight controller 315 of the EC system 310 coordinates and processes software for the aerial vehicle 110. The flight controller 315 may integrate the AVOS. Examples of processing directed by the flight controller 315 include coordinating communication with the remote controller 120 through the communication subsystem 360 and processing commands to and from the remote controller 120. The flight controller 315 also may control flight related operations of the aerial vehicle 110 by control over the other components such as the electronic speed controller 320 and the sensor subsystem 335. The flight controller 315 also interfaces with the gimbal control 330 to assist with controlling the gimbal motors of the gimbal 210. In addition, the flight controller 315 may be used to assist with the image link 345 for camera control operations.

Referring now to the electronic speed controller 320, it is configured to interface with the thrust motors electronics 325. The electronic speed controller 320 may be configured to control, via the thrust motors electronics 325, the speed applied by the thrust motors 240 to the propellers 140. The electronic speed controller 320 may control each thrust motor 240 through the thrust motors electronics 325 individually or in groups or subgroups. It is noted that the thrust motors electronics 325 may be integrated with the thrust motors 240.

Next, the gimbal controller 330 may include control electronics (and may include firmware) that may be configured to control operation of the motors for each axis of the gimbal. The gimbal controller 330 receives commands via the flight controller 315. The commands may originate from the remote controller 120, which passes them to the flight controller 315 via the communication subsystem 360.

Turning next to the image link controller 345, it is configured to communicate with the camera interface 345 to transmit commands that can include capture of images from a camera for transmission to the remote controller 120 (and/or other device with screen such as a smart phone or tablet), e.g., via the communication subsystem 360. The images may be overlaid and/or augmented with other data from the aerial vehicle such as the sensor data from the sensor subsystem 335. When images are sent to both the remote controller 120 and another device, the overlaid information may be the same on each device or distinct on each device. It is noted that the image link controller 345 may have a processing configuration that allows commands to be directly transmitted between the communication subsystem 360 and the camera interface 350. Alternately, or in addition, the image link controller 345 may communicate with the flight controller 315 for processing resources and application of software configurations.

The camera interface 350 may be configured to receive camera control commands from the image link controller 345. The camera commands can include commands to set up camera operations, e.g., frame capture rate, still or video images, etc. The camera commands may originate from the remote controller 120 and be received via the communication subsystem 360 and image link controller 345 of the EC system 310.

Turning next to the sensor subsystem 335, it may include one or more sensors. Each set of sensors may be further grouped as sensor modules to gather particular types of data. For example, one sensor module may be for positional sensors and another sensor module may be for environmental sensors. Positional sensors can provide location and/or relative location in space and orientation information of the aerial vehicle 110. Positional sensors can assist with navigation and location related operations of the aerial vehicle 110. Positional sensors can include, for example, a gyroscope, accelerometer, a compass, a global positioning system (GPS) sensor, a motion sensor, and/or an altimeter. Environmental sensors can provide information of a particular environment. For example, environmental sensors can provide information on environmental conditions external to the housing 130 of the aerial vehicle 110. Further by example, environmental sensors can provide information on conditions within the housing 130 of the aerial vehicle 110. Environmental sensors can include, for example, a temperature sensor, a photodetector, a heat sensor, a moisture sensor, and/or a barometric sensor. It is noted that in some example instances an environmental sensor can also operate as a positional sensor for purposes of how the data may be used and vice versa. For example, a photodetector may be used to determine time of day for a flight, but also can be used to detect shadows for avoidance detection during flight of the aerial vehicle 110. Similarly by way of example, a barometric sensor may be used to determine atmospheric pressure and aerial vehicle 110 altitude. Note that other sensor configurations also may be included in addition to the examples given.

The sensor data from the sensor subsystem 335 may comprise sensor metadata and can be integrated with images and/or metadata from a camera. The images from the camera, which may also include additional metadata, can be transmitted wirelessly to other devices and/or stored for later playback. When the images are displayed (e.g., played in real time or from storage), the sensor data can be extracted from it and provided for display on a screen, e.g., the screen 170 of the remote controller 120 or a screen of a computing device (e.g., laptop, smartphone, tablet, desktop computer, etc.). The camera interface 350 can interface with a camera or may include an integrated camera. The integrated camera would be positioned similar to the camera mount 220. Alternately, the camera may incorporate a camera mount.

The power subsystem 340 may be configured to manage and supply power to the components of the EC system 310. The power subsystem 340 can include a battery pack and a protection circuit module as well as a power control/battery management system. The battery can be replaceable and/or rechargeable. The battery of the power subsystem 340 can be configured to charge the camera in flight as needed or pre-flight. Other devices also may be charged using the energy capacity of the battery of the power subsystem 340, for example, the remote controller 120, a powered handheld grip, or a mobile phone. The battery also can be used to charge the camera, or other devices, post-flight, depending on energy remaining in the battery. Further, the power subsystem 340 can be configured to include a dual power path. A first path allows for a first power level, e.g., low current, to be used to power up the aerial vehicle 110 and its onboard components. Once components are powered the aerial vehicle 110 can transition to a second power level, e.g., high current, which is sufficient to consistently drive the thrust motors 240 and onboard components during flight. In addition, a regenerative charging configuration can be integrated into the power subsystem 340. For example, the power subsystem 340 can include a recharge circuit electrically coupled with the thrust motors 240 so that when the thrust motors 240 are decelerating, current is pushed back through the recharge circuit to charge the battery of the power subsystem 340.

The communication subsystem 360 may include communication electronics (and may include corresponding firmware) for the aerial vehicle 110. For example, the communication subsystem 360 can include a long range WiFi system. It can include additional wireless communication components. For example, it may include another WiFi system, which may allow for one WiFi system to be dedicated to direct control communications with the remote controller 120 and the other WiFi system may be used for other communications, such as image transmissions). It can include a communication system such as one based on long term evolution (LTE), 3G, 4G, 5G or other mobile communication standard. The communication subsystem 360 may be configured with a uni-directional remote control channel for communication of controls from the remote controller 120 to the aerial vehicle 110 and a separate unidirectional channel for an image downlink from the aerial vehicle 110 to the remote controller 120 (or to a video receiver where direct image connection may be desired). The communication subsystem 360 can be used to allow for other services, for example, to provide over the air or hardwire link updates, such as firmware updates to the aerial vehicle 110. Some third-party services may be provided access to the communication subsystem 360 or components within via application programming interfaces (API).

Example Interconnect Architecture for Aerial Vehicle

Figure 4:
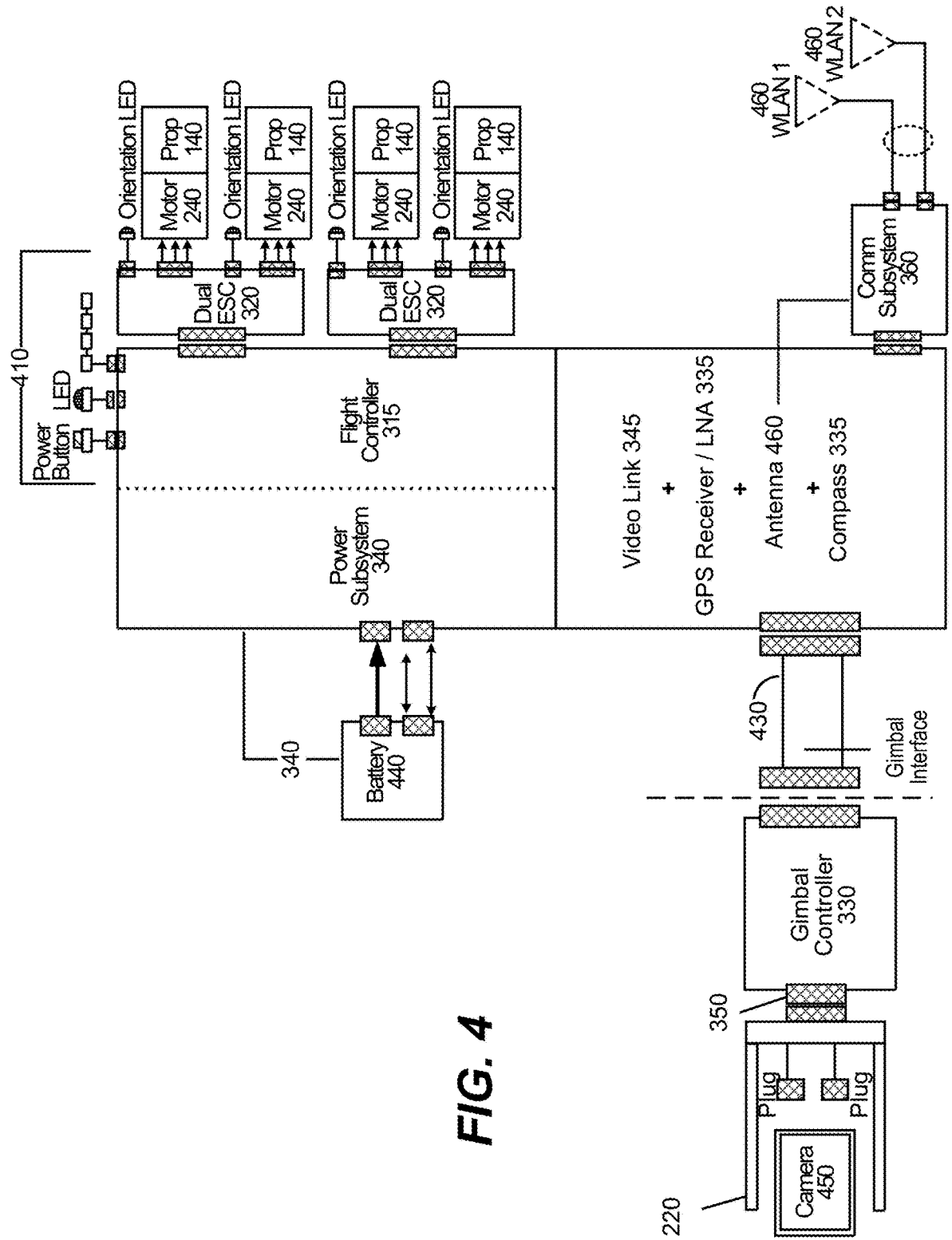
FIG. 4 illustrates an example interconnect architecture of an aerial vehicle with a gimbal.

Turning to FIG. 4, it illustrates an example interconnect architecture of the remote controlled aerial vehicle 110 with the gimbal 220. This example embodiment includes the components illustrated and described in the prior figures, e.g., FIG. 3. In addition, there are shown additional components such as LEDs 410 on the aerial vehicle 110 that can be used to provide information, e.g., vehicle status related information. Also shown is a battery 440 as a part of the power subsystem 340. The battery 440 provides direct current power and may be rechargeable. Also illustrated is an antenna 460, which may be part of the communication subsystem 360.

In addition, the figure illustrates an example embodiment in which the flight controller 315 is coupled with two electronic speed controllers 320. Each electronic speed controller 320 in this configuration drives two thrust motors 240, for example, through the thrust motors electronics 325 (not shown).

Also shown is a gimbal interface 430 that can couple the gimbal controller 330 with components of the EC system 310. In particular, the gimbal interface 430 is communicatively coupled with the image link controller 345, the sensor subsystem 335 (e.g., GPS, compass, etc.), and the antenna 460. The gimbal interface 430 is used to transmit this data to the gimbal controller 330. The gimbal controller 330 uses this data to adjust the camera mount 220. It is noted that the camera mount 220 can secure a camera 450.

The gimbal controller 330 is communicatively coupled with the camera 450 through one or more camera interface 350 connectors. The camera interface 350 connectors can include camera communication interfaces such as universal serial bus (USB) or HDMI. The images captured by the camera can be communicated (transmitted) back to the aerial vehicle 110 through the camera interface 350 connectors and gimbal interface 430. The transmission of the images may be at high (or full) resolution (e.g., uncompressed) or at a lower (or partial) resolution (e.g., compressed). Data, e.g., sensor data from the sensor subsystem 335, also can be sent via the camera interface 350 connectors to the camera 450 to associate with video captured and stored on the camera 450.

Example Camera Architecture

Figure 5:
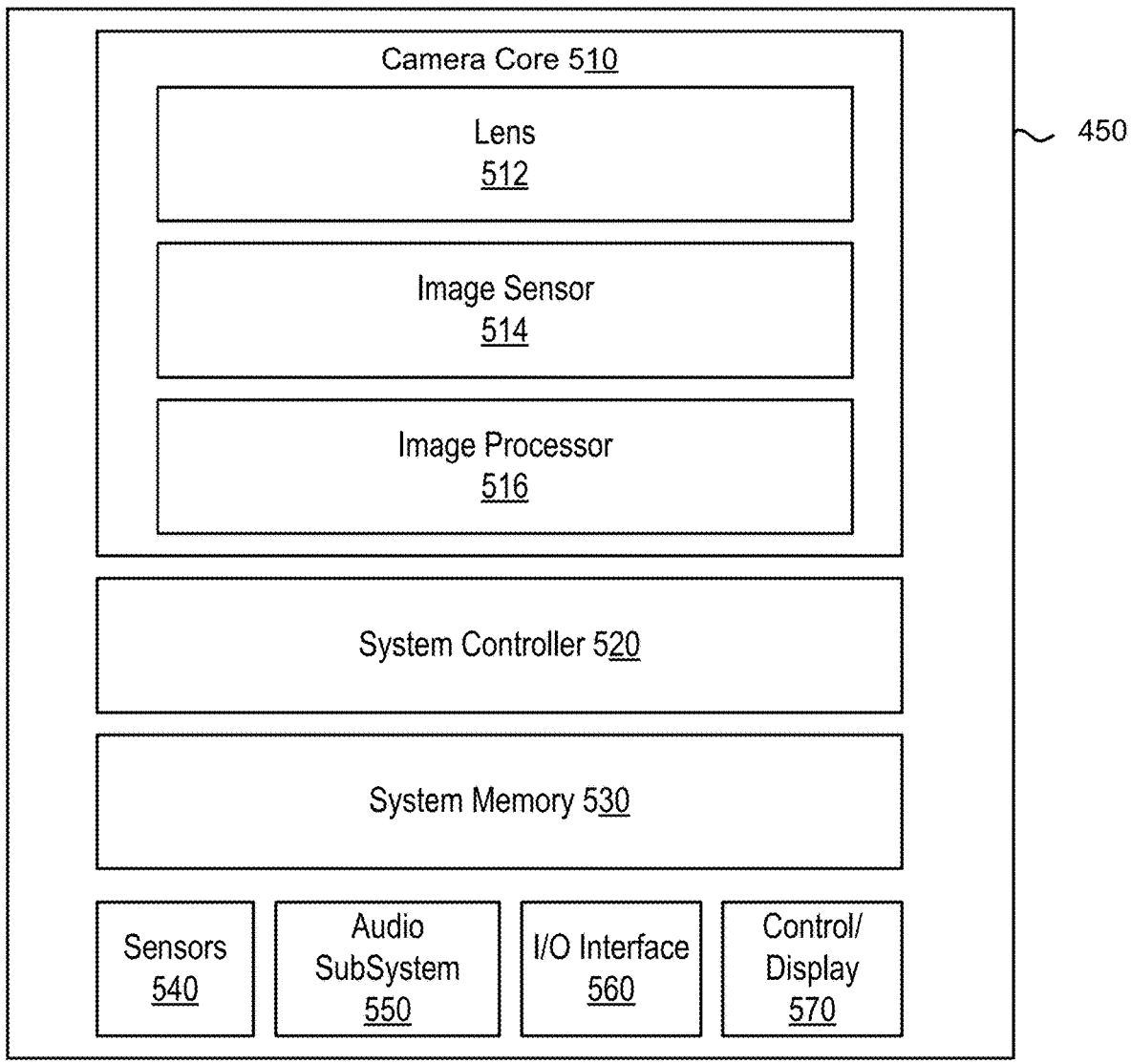
FIG. 5 illustrates a block diagram of an example camera architecture.

FIG. 5 illustrates a block diagram of an example camera architecture 505. The example camera architecture 505 corresponds to an architecture for the camera, e.g., 450. It is noted that the camera 450 may be independent of or integrated with the aerial vehicle 110. When integrated with the aerial vehicle 110, the camera 450 may also be integrated with a gimbal, e.g., 210. Alternately, when independent, the camera 450 may be removably attached to the aerial vehicle 110. When removably attached, the camera 450 may be removably coupled to the gimbal 210 that couples the aerial vehicle 110. As previously noted, the gimbal 210 may be removably coupled with the aerial vehicle 110. Alternately, the gimbal 210 may be integrated with the aerial vehicle 110. For ease of discussion, the camera 450 is described in a configuration where it is removably coupled with the gimbal 210 via a camera mount 220 and the gimbal 210 also is removably coupled with the aerial vehicle 110. However, the principles noted apply also in the instances in which the camera is integrated with the aerial vehicle 110.

Referring briefly to the camera 450 itself, it can include a camera body, one or more a camera lenses, various indicators on the camera body (such as LEDs, displays, and the like), various input mechanisms (such as buttons, switches, and touch-screen mechanisms), and electronics (e.g., imaging electronics, power electronics, metadata sensors, etc.) internal to the camera body for capturing images via the one or more lenses and/or performing other functions. In one embodiment, the camera 450 is capable of capturing spherical or substantially spherical content. As used herein, spherical content may include still images or video having spherical or substantially spherical field of view. For example, in one embodiment, the camera 450 captures video having a 360 degree field of view in the horizontal plane and a 180 degree field of view in the vertical plane. Alternatively, the camera 450 may capture substantially spherical images or video having less than 360 degrees in the horizontal direction and less than 180 degrees in the vertical direction (e.g., within 10% of the field of view associated with fully spherical content). In other embodiments, the camera 450 may capture images or video having a non-spherical wide angle field of view.

As described in greater detail below, the camera 450 may include sensors to capture metadata associated with video data, such as timing data, motion data, speed data, acceleration data, altitude data, GPS data, and the like. In one example embodiment, location and/or time centric metadata (geographic location, time, speed, etc.) can be incorporated into an image (or media) file together with the captured content in order to track over time the location of the camera 450 or the subject being recorded by the camera 450. This and sensor metadata may be captured by the camera 450 itself or by another device proximate to the camera 450 (e.g., a mobile phone, a data tracker worn by a subject (e.g., a smart watch or fitness tracker equipped with tracking software or a dedicated radio frequency tracker), the aerial vehicle 110 via the camera interface 350, etc.).

In one embodiment, the metadata may be incorporated with the content stream by the camera 450 as the content is being captured. In another embodiment, a metadata file separate from the image file may be captured (by the same capture device or a different capture device) and the two separate files can be combined or otherwise processed together in post-processing. It is noted that these sensors can be in addition to the sensors of the sensor subsystem 335. In embodiments in which the camera 450 is integrated with the aerial vehicle 110, the camera need not have (or need not operate) separate individual sensors, but rather could rely upon the sensors integrated with the aerial vehicle 110. The data captured by the sensors may be referenced as sensor metadata. The sensor metadata, as well as camera metadata from the camera 450, may be integrated with and/or used with aerial vehicle metadata captured from sensors on the aerial vehicle 110, for example, the environmental sensors, positional sensors, etc.

Referring now to the example camera architecture 505 of the camera 450, it may include a camera core 510 comprising a lens 512, an image sensor 514, and an image processor 516. The camera 450 also may include a system controller 520 (e.g., a microcontroller or microprocessor) that controls the operation and functionality of the camera 450 and system memory 530 configured to store executable computer instructions that, when executed by the system controller 520 and/or the image processors 516, perform the camera functionalities described herein. In some embodiments, a camera 450 may include multiple camera cores 510 to capture fields of view in different directions which may then be stitched together to form a cohesive image. For example, in an embodiment of a spherical camera system, the camera 450 may include two camera cores 510 each having a hemispherical or hyper hemispherical lens that each captures a hemispherical or hyper hemispherical field of view which is stitched together in post-processing to form a spherical image.

The lens 512 can be, for example, a wide angle lens, hemispherical, or hyper hemispherical lens that focuses light entering the lens to the image sensor 514 which captures video. The image sensor 514 may capture high-definition images having a resolution of, for example, 720p, 1080p, 4 k, or higher. In one embodiment, spherical images may be captured as a 5760 pixels by 2880 pixels with a 360 degree horizontal field of view and a 180 degree vertical field of view. For images, the image sensor 514 may capture images at frame rates of, for example, 30 frames per second, 60 frames per second, 120 frames per second or higher.

The image processor 516 can perform one or more image processing functions of the captured images or video. For example, the image processor 516 may perform a Bayer transformation, demosaicing, noise reduction, image sharpening, image stabilization, rolling shutter artifact reduction, color space conversion, compression, or other in-camera processing functions. The image processor 516 also may be configured to perform real-time stitching of images, for example, when images are capture from two or more cameras coupled with the aerial vehicle 110 and configured to capture images. Such example configurations may include, for example, an activity camera (which may include a spherical image capture camera) that captures images, each with a substantially different field of view (FOV), but where there may be some overlap where the images can be stitched together. Processed images may be temporarily or persistently stored to system memory 530 and/or to a non-volatile storage, which may be in the form of internal storage or an external memory card, as shown and described in the example architecture of FIG. 4.

An input/output (I/O) interface 560 transmits and receives data from various external devices. For example, the I/O interface 560 may facilitate the receiving or transmitting image information through an I/O port. Control information, e.g., from/to a gimbal controller 330, also may be transmitted via the I/O interface 560. Examples of I/O ports or interfaces include USB ports, HDMI ports, Ethernet ports, audio ports, and the like. Furthermore, embodiments of the I/O interface 560 may include wireless ports that can accommodate wireless connections. Examples of wireless ports include Bluetooth, Wireless USB, Near Field Communication (NFC), and the like. The I/O interface 560 may also include an interface to synchronize the camera 450 with other cameras or with other external devices, such as a remote control, a second camera, a smartphone, a client device, or a video server. For example, a camera 450 mounted to an aerial vehicle 110 may be synchronized wirelessly (e.g., using time codes) with a camera on another aerial vehicle or on the ground so that video captured by the various cameras can be synchronized.

A control/display subsystem 570 includes various control components associated with operation of the camera 450 including, for example, LED lights, a display, buttons, microphones, speakers, etc. The audio subsystem 550 includes, for example, one or more microphones and one or more audio processors to capture and process audio data correlated with video capture. In one embodiment, the audio subsystem 550 includes a microphone array having two or more microphones arranged to obtain directional audio signals.

Sensors 540 capture various metadata concurrently with, or separately from, image capture. For example, the sensors 540 may capture time-stamped location information based on a global positioning system (GPS) sensor. Other sensors 540 may be used to detect and capture orientation of the camera 450 including, for example, an orientation sensor, an accelerometer, a gyroscope, an altimeter, or a magnetometer. Sensor data captured from the various sensors 340 may be processed to generate other types of metadata. For example, sensor data from the accelerometer may be used to generate motion metadata, comprising velocity and/or acceleration vectors representative of motion of the camera 450. Furthermore, sensor data from the aerial vehicle 110 and/or the gimbal 210/gimbal controller 330 may be used to generate orientation metadata describing the orientation of the camera 450. Sensor data from the GPS sensor provides GPS coordinates identifying the location of the camera 450, and the altimeter measures the altitude of the camera 450. In one embodiment, the sensors 540 are rigidly coupled to the camera 450 such that any motion, orientation or change in location experienced by the camera 450 is also experienced by the sensors 540. The sensors 540 furthermore may associate one or more time stamps representing when the data was captured by each sensor. In one embodiment, the sensors 540 automatically begin collecting sensor metadata when the camera 450 begins recording a video. As noted previously, the sensor data from the camera architecture may be integrated with and/or used with sensor data from the aerial vehicle 110. It is noted that in example embodiments in which sensors of a particular type are missing from the aerial vehicle 110, the sensors 540 of the camera 450 can provide the requisite sensor data for appropriate processing operations.

As noted above, the camera 450 may also be controlled remotely, for example, through the remote controller 120, or through other devices in wireless communication with the camera, either directly or through the aerial vehicle 110. Accordingly, control functions of the camera 450 can be manipulated before, during or after flight (e.g., at landing). For example, during flight the camera 450 can be configured to switch from shooting images at 30 frames per second to 60 frames per second (fps). In this example, an aerial vehicle 110 may follow a skier down a slope and start capturing images through the camera 450 at 30 fps. As the skier accelerates, e.g., for a jump, the camera 450 automatically switches to capturing images at 60 fps. Also by way of example, if the skier is in the distance, e.g., 20 meters, the camera 450 may being to capture images at 30 fps, but as the aerial vehicle draws closer, e.g., within 5 meters, the camera 450 can automatically switch to capturing images at 60 fps.

Moreover, an operator may seek to switch the camera 450 from taking images, in one mode, e.g., low resolution images (e.g., lower pixel count, lower frames per second, etc.), to taking images in another mode, e.g., high resolution images (e.g., higher pixel count, higher frames per second, etc.), while the aerial vehicle 110 is in flight and the camera 450 is operational. The positioning of the camera 450 can also be further controlled from an operator on the ground transmitting signals from the remote controller 120 or mobile device to move the camera angle through movement of appropriate gimbal 210 components. Further by example, at landing the camera 450 can be configured to take images, e.g., to assist with location analysis for locating the aerial vehicle 110.

Example System Components of the Remote Controller

Figure 6:
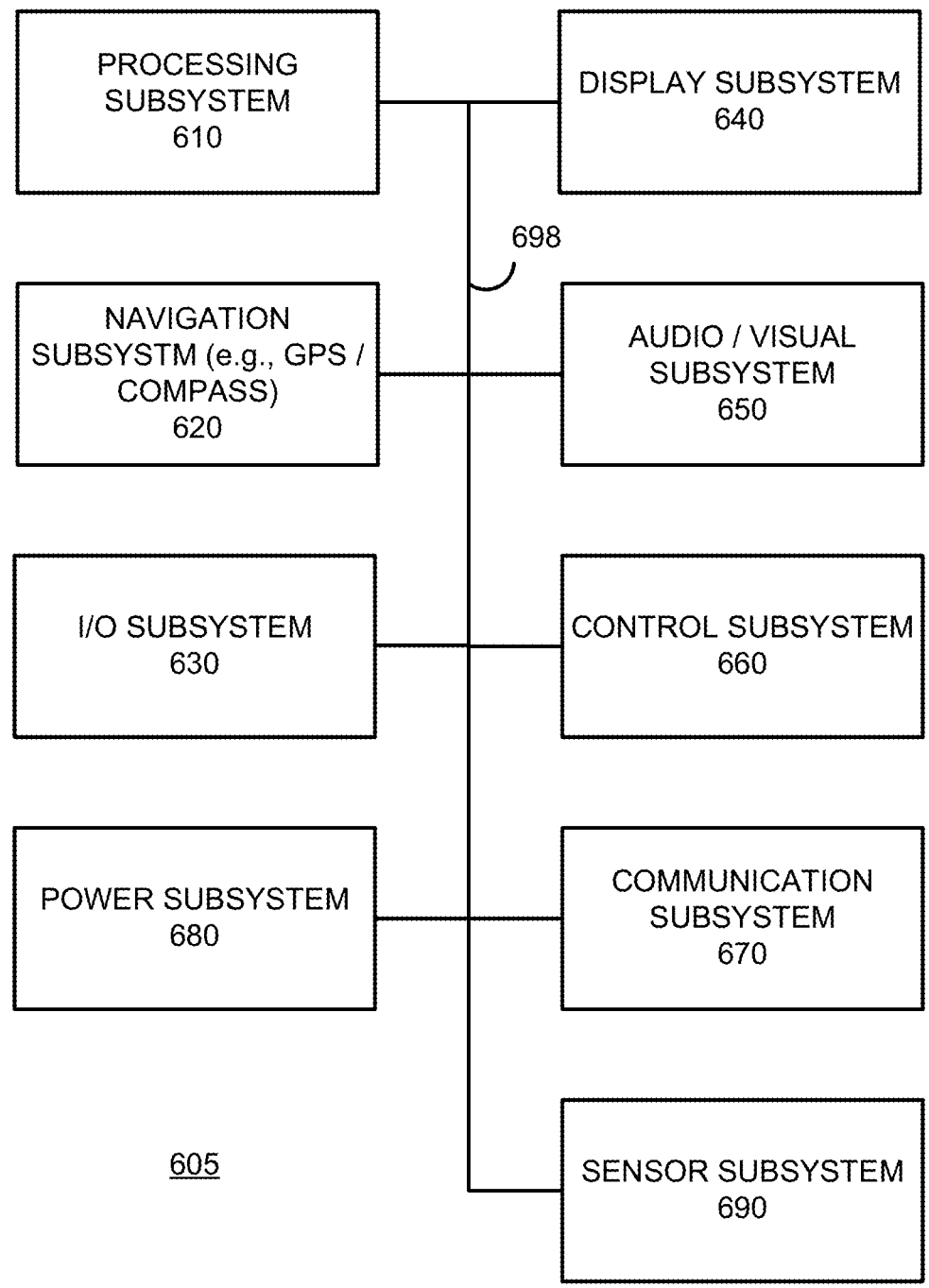
FIG. 6 illustrates a block diagram of an example remote control system of a remote controller.

Referring now to FIG. 6, it illustrates a block diagram of example electronics system 605 components and/or subsystems of a remote controller, e.g., 120. The electronics system 605 may include a processing subsystem 610, a navigation subsystem 620, an input/output (I/O) subsystem 630, a display subsystem 640, an audio/visual (A/V) subsystem 650, a control subsystem 660, a communication subsystem 670, a power subsystem 680, and sensor subsystem 690. The subsystems may be communicatively coupled through a data bus 698 and may be powered, where necessary, through the power subsystem 680.

The processing subsystem 610 may be configured to provide the electronic processing infrastructure to execute firmware and/or software comprised of instructions. The software, which can include firmware, may be referenced as program code, computer program product, or program instructions, and comprises instructions. Software, which may include operating system software, may be executed by one or more processors with the remote controller 120. A processor also may include, for example, controllers, application specific integrated circuits (ASICs) and/or field programmable gate arrays (FPGAs). The processor may be configured to execute the software in a specific manner. Software may be configured to operate with an operating system, which provides an interface to the processor.

The processing subsystem 610, which may include one or more processors, may be part of a machine and/or computer system. FIG. 14 provides an example machine with a processor that can be configured to execute software as part of the processing subsystem 610. It is noted that not all the components of FIG. 14 may be included in the remote controller 120. FIG. 14 is intended to be illustrative in describing an architecture of a computing system, of which all or parts can operate as part of the processing subsystem 610 of the remote controller 120.

The processing subsystem 610 in this example also may be configured to include a remote controller operating system (RCOS). The RCOS may be built upon an operating system kernel, for example, an LINUX kernel, and/or an existing operating system, for example, an ANDROID operating system. In addition, the processing subsystem 610 can provide the execution framework for applications built to operate within the remote controller 120.

The navigation subsystem 620 may include electronics, controls and interfaces for navigation instrumentation for the remote controller 120. These may be embodied in hardware, software, or a combination thereof. For example, the navigation subsystem 620 uses a global position system (GPS) and a compass embodied in hardware (see sensor subsystem 690 below) and/or software for providing coordinates and headings information of the remote controller 120 relative to the aerial vehicle 110. In this example, the GPS and/or compass may be used to track location and heading of the remote controller 120, which can be helpful for the remote controller 120 and the aerial vehicle 110 to computationally understand location and positioning of each relative to the other.

The I/O subsystem 630 may include the input and output interfaces and electronic couplings to interface with devices that allow for transfer of information into or out of the remote controller 120. For example, the I/O subsystem 630 can include a physical interface such as a universal serial bus (USB) or a media card (e.g., secure digital (SD)) slot. The I/O subsystem 630 also can be associated with the communication subsystems 670 to include a wireless interface such as Bluetooth. In addition, it is noted that in one example embodiment, the aerial vehicle 110 uses long range WiFi radio within the communication subsystem 670, but may also use a second WiFi radio or cellular data radio (as a part of the I/O subsystem 630) for connection other wireless data enabled devices, for example, smart phones, tablets, laptop or desktop computers, and/or wireless internet access points. Moreover, the I/O subsystem 630 may also include other wireless interfaces, e.g., radio frequency tags, cellular (mobile) communication protocols, short range WiFi, etc., for communicatively coupling devices that are similarly wirelessly enabled for short range communications.

The display subsystem 640 may be configured to provide an interface, electronics, and display drivers for the screen 170 of the remote controller 120. The display subsystem 640 can be configured to display information corresponding to the remote controller 120, for example, menus, settings, control information, etc. The display subsystem 640 also can be configured to display images captured from the camera 450 on the aerial vehicle 110. Moreover, the display subsystem can overlay images captured from camera on the aerial vehicle 110 with a display of gauges corresponding to metadata associated with captured video in a "dashboard" type visual display, for example, as illustrated in the example user interface in FIG. 13.

The A/V subsystem 650 may include the interfaces, electronics, and drivers for an audio output (e.g., headphone jack or speakers) as well as visual indicators (e.g., LED lighting associated with, for example, the buttons 160, 165). The A/V subsystem 650 can be configured to provide alarms, indicators, or other types of notifications audibly, visually, or a combination thereof. The notifications can be in voice format. The A/V subsystem 650 can provide notifications corresponding to operation of the aerial vehicle 110 and/or the remote controller 120. For example, if battery power level drops below predetermined threshold on the aerial vehicle 110, the aerial vehicle 110 can communicate this information back to the remote controller 120. The communication subsystem 670 of the remote controller 120 receives this information and it gets passed to the A/V subsystem 650. The A/V subsystem 650 can provide a visual notification, e.g., flashing or lighting an LED or light in red and/or an audible notification such as a beeping alarm and/or pre-recorded voice notice ("low battery"). The A/V subsystem 650 also can provide notifications of other devices that may be communicatively coupled with the remote controller 120, e.g., a smartphone coupled with the remote controller 120 through a Bluetooth connection.

The control subsystem 660 may include electronic and control logic and firmware for operation with the control panels 150, 155. The control subsystem 660 translates movements made through the control panels 150, 155 into appropriate movement commands corresponding to the aerial vehicle 110. The movement commands are transmitted through the communication subsystem 670 described below. The control subsystem 660 can be configured so that coarseness of movements through the control panels 150, 155 can be calibrated prior to transmission to the aerial vehicle 110. For example, users having a "light" touch (e.g., refined, smooth movement) can have touches through the control panels 150, 155 translated by the control subsystem 660 into a greater range of fine movements. Also by example, user with a "heavy" tough (e.g., more "jerky" control) can have touches through the control panels 150, 155 translated by the control subsystem 660 to have a lower range of fine movements to help ensure that such movements to not inadvertently jar the aerial vehicle 110 to an extreme operating condition that may cause it to stop flying.

The communication subsystem 670 may include electronics, firmware and interfaces for communications. The communications subsystem 670 can include one or more of wireless communication mechanisms, for example, WiFi (short and long range), cellular/mobile communication systems (e.g., long term evolution (LTE), 3G/4G/5G), Bluetooth, etc. The communication subsystem 670 can include wired communication mechanisms such as Ethernet, USB, and HDMI. The communication subsystem 670 can be used to allow for third-party services to provide over the air or hardwire link updates, such as firmware updates to the remote controller 120. It is noted that in some example embodiments, the communication subsystem 670 can include two (or more) different WiFi radios for communication. For example, one radio can be configured to be a dedicated connection between a WiFi radio in the communication subsystem 670 of the remote controller 120 and a WiFi radio in the communication subsystem 360 of the aerial vehicle 110. This dedicated radio link (or communication coupling) may be for transmitting and receiving communications associated with flight control. The dedicated link can help enhance communication between the devices as no other devices may compete for bandwidth and processing cycles. Continuing with the example, a second radio can be configured for other communications, for example, transmission of images and/or data from the remote controller 120 to another device, e.g., a mobile hotspot, a laptop computer, a tablet, a smartphone, etc.

The power subsystem 680 may include electronics, firmware and interfaces for providing power to the electronics system 605 of the remote controller 120. The power subsystem 680 may include direct current (DC) power sources (e.g., batteries, which may be rechargeable), but also can be configured for alternating current (AC) power sources. The power subsystem 680 also may include power management processes for extending DC power source lifespan.

In some embodiments, the power subsystem 680 may be comprised of power management integrated circuit and a low power microprocessor for power regulation. The microprocessor in such embodiments is configured to provide very low power states to preserve battery, and ability to wake from low power states from such events as a button press or an on-board sensor (like a Hall effect sensor) trigger. It is noted that the power subsystem 680 may include a battery system that is replaceable and/or rechargeable. The battery can include a high energy storage capacity and can be configured to couple its power line with an interface, e.g., a universal serial bus interface, to which other devices, e.g., the aerial vehicle 110, a mobile computing device, etc., can connect to have their batteries charge using this battery source.

The sensor subsystem 690 may include a wide range of sensors. For example, in addition to a GPS, the remote controller 120 also may include sensors such as barometer, temperature, altitude, moisture, etc. The sensor data from the sensors can be integrated with images received from a camera. The sensor data can augment or supplement the sensor data captured and received from the aerial vehicle 110 and/or the camera 450. When the image is displayed (real time or from storage), the sensor data can be extracted from it can be provided for display on a screen, e.g., the screen 170 of the remote controller 120 or a screen of a computing device (e.g., laptop, smartphone, tablet, or desktop computer). The sensor data from the sensor subsystem 690 also can be used to assist with aerial vehicle 110 operations. For example, if high moisture levels are detected by the sensor subsystem 690, a signal can be transmitted via the communication subsystem 670 to trigger a return to home in the aerial vehicle 110. Return to home is further described below.

Flight Plan Control System in Remote Controller

Turning now to the aerial vehicle 110, examples are now provided for software configurations that can operate on the aerial vehicle 110. One example software configuration is a flight plan control system for generation and operation in a remote controller 120. A flight plan provides the aerial vehicle 110 with basic flight related parameters, even though the remote controller 120 may be used for the overall control of the aerial vehicle 110. The flight plan control system provides, for example, information on system checks of the aerial vehicle 110, route information, obstacle avoidance information, rules (or factors) for return of the aerial vehicle 110 (e.g., to set down at a return location), etc.

To prepare an aerial vehicle, e.g., 110 for flight, the aerial vehicle 110 may be programmed via software with a flight plan. The flight plan may be uploaded to the aerial vehicle 110, through a remote controller, e.g., 120, cloud database, a storage device, etc.

Figure 7A:
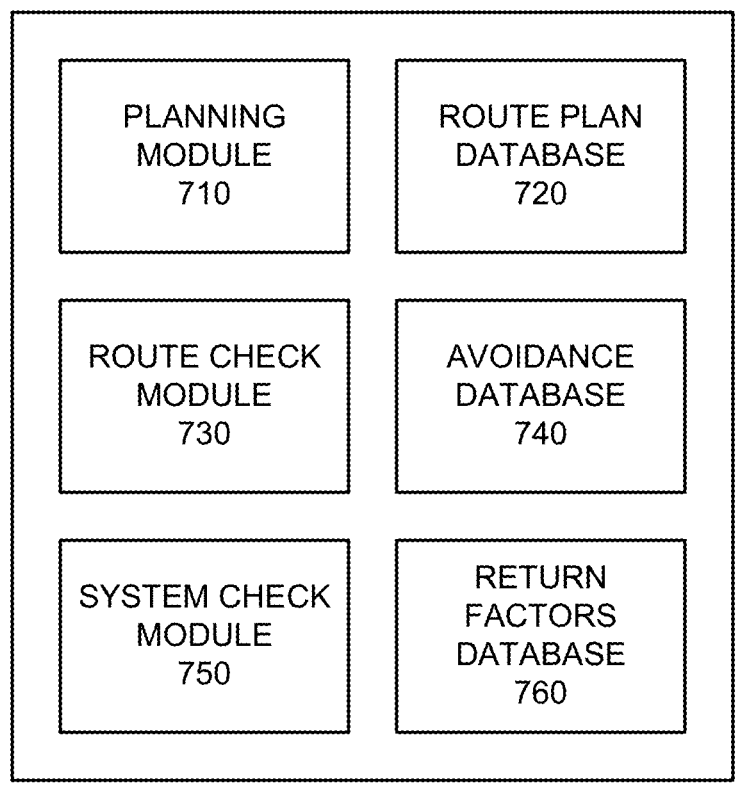
FIG. 7A illustrates a functional block diagram of an example remote controller flight plan control system for a remote controller.

FIG. 7A illustrates a functional block diagram of an example flight plan control system 705 generated through a remote controller 120. The system 705 may include modules such as a planning module 710, a route plan database 720, a route check module 730, an avoidance database 740, a system check module 750 and a return factors database 760. It is noted that the modules may be embodied as software (including firmware) generated through the processing subsystem 610. The database may be referenced as modules with respect to the processing corresponding to the data stored and retrieved from its system. Also, the configuration described here can be uploaded from the remote controller 120 to the aerial vehicle 110 for operation. Alternatively or additionally, the flight plan control system software can be transmitted and executed on the aerial vehicle 110 as it is flying so that any changes in the flight plan control system can be immediately transmitted from the remote controller 120 to the aerial vehicle 110 for execution on the aerial vehicle 110.

The planning module 710 can be configured to provide flight (or route) planning tools that allow for preparing and/or executing a flight plan. The flight plan may be used by the aerial vehicle 110, for example, in an auto-pilot mode and/or in conjunction with user input via the remote controller 120 when the aerial vehicle 110 is flying. The planning module 710 may include one or more user interfaces displayed on the screen 170 of the remote controller 120. The interface is configured for entering and viewing of information for a flight route (or path). For example, the planning module 710 may be configured to determine how and where the aerial vehicle 110 may travel as a part of the flight plan. The planning module 710 also may use data from other sources to integrate with the flight plan, for example, maps (geographic information over where the aerial vehicle 110 will travel), environmental condition data (e.g., wind speed and direction, temperature, barometric pressure, etc.), terrain condition data (e.g., locations of trees, tall dense shrubs, rock formations, etc.), and other information that may be necessary for planning and executing a flight of the aerial vehicle 110. The route planning module 710 may be configured to import in a pre-flight route map described further below with FIGS. 7B and 7B for the flight plan.

The route plan database 720 can be configured to provide a repository (e.g., that is part of a storage device such as an example storage device described with FIG. 14) for in preparation or prepared flight plans to be stored. The stored flight plans may be previously created on the remote controller 120 or uploaded into it (e.g., through the I/O subsystem 630). The stored plans can be retrieved from the flight plan database 720 and edited as appropriate through the planning module 710.

The route plan database 720 may store preplanned (pre-programmed) maneuvers for the aerial vehicle 110 that can be retrieved and applied with a flight plan created through the planning module 710. For example, acrobatic maneuvers such as a "loop de loop" maneuver can be pre-stored and retrieved from the flight plan database 720 and then applied to a flight plan over a mapped area (the map also can be stored in and retrieved from the flight plan database 720) via the planning module 710. Also by way of example, two or more aerial vehicles may store preplanned maneuvers that allow for synchronization in flight amongst the two or more aerial vehicles.

It is noted that the route plan can be configured to provide a predefined "band" (area or region where operation is permissible) within with the aerial vehicle 110 is controlled through the remote controller 120. Other examples of pre-planned maneuvers can include highly complex stunts or cinematic maneuvers with of the aerial vehicle 110, in which the particular coordinates and configuration parameters of the aerial vehicle 110 can be set or pre-determined in advance, e.g., on a laptop and/or downloaded from a software library. Further, the pre-programmed flight maneuvers may be coordinated between two or more aerial vehicles 110, e.g., to engage in a synchronized flight routine.

The route check module 730 may be configured to conduct a check of the desired flight route (or path) to evaluate potential issues with the route planned. For example, the route check module 730 may be configured to identify particular factors such as terrain elevation that may be challenging for the aerial vehicle 110 to clear. In addition, the route check module 730 can check environment conditions along the route planned to provide information on potential challenges such as precipitation, wind speed and/or wind direction.

The route check module 730 may also retrieve data from the avoidance database 740 for use in checking a particular planned route. The data stored in the avoidance database 740 may include data such as flight related restriction on terms of areas/boundaries for flight (e.g., no fly areas or no fly beyond a particular boundary (aerial restrictions)), altitude restrictions (e.g., no fly above a ceiling of some predefined altitude or height), proximity restrictions (e.g., power lines, vehicular traffic conditions, or crowds), obstacle locations (e.g., monuments, trees, etc.) and the like. In addition, the route plan module 730 also can include information corresponding to information on where the aerial vehicle 110 can or cannot set down. For example, the route plan module 730 may incorporate in information where the aerial vehicle cannot land ("no land zone"), for example, highways, bodies of water (e.g., pond, stream, rivers, lakes, ocean, etc.) or restricted areas. Some retrieved restrictions may be used to adjust the planned route before flight so that when the plan is uploaded into the aerial vehicle, flight along a particular path is not allowed in terms of the remote controller 120 controlling the aerial vehicle 110 to fly in a restricted path or restricted area. Other retrieved restriction data from the avoidance database 740 can be stored with the route plan and also may be uploaded into the aerial vehicle 110 for use during the flight by the aerial vehicle 110. The stored information can be used to make route adjustments when detected, e.g., via the system check module 750 described below.

Continuing with the route check module 730, it also can be configured to alter or provide recommendations to alter the route plan to remove conditions in the flight plan path that may not be conducive for the aerial vehicle 110 to fly through. The altered path or suggested path can be displayed through the planning module 710 on the screen 170 of the remote controller 120. The revised route can be further modified if so desired and checked again by the route check module 730 in an iterative process until the route is shown as clear for flight of the aerial vehicle 110.

The system check module 750 can be configured to communicate with the aerial vehicle 110, e.g., through the communication subsystem 670. The system check module 750 receives data from the aerial vehicle 110 corresponding to conditions corresponding to the aerial vehicle 110 or the surroundings within which the aerial vehicle 110 is operating. The system check module 750 can interface with the planning module 710 and route check module 730 to make route adjustments for the aerial vehicle 110 for flight along the planned route.

The return factors database 760 can be configured to store data related to when the aerial vehicle 110 should return to a predefined location. The return data may be referenced as "return to home" or "RTH" or "return path". Return to home location may be predetermined, but can include, for example, the initial location from which the aerial vehicle 110 took flight, the location where the remote controller 120 is currently located (e.g., if the user moves location), or some predefined coordinates. The route plan module 710, and in some embodiments the route check module 730, can interface with the return factors database 760.

The data from the return factors database 760 can be stored with the route plan and uploaded into the aerial vehicle 110. The data also can be used by the system check module 750 to trigger an action to command the aerial vehicle 110 to go to the predefined location. The return data can be data corresponding to operation of the aerial vehicle 110, for example, battery power remaining (e.g., return if battery power below predefined threshold that would prevent return of the aerial vehicle 110) or mechanical condition (e.g., motor engine stall or burnout). The return data also can be environment data (e.g., wind speed in excess of a predefined threshold) or terrain data (e.g., tree density beyond predefined threshold). The return location can be predefined through the planning module 710 by providing, for example, GPS coordinate information. Alternately, it can be the location of the remote controller 120. In addition, using the information provided from the return factors database 760, the aerial vehicle 110 may be configured to set down at or near its current location if the system check module 750 determines that the aerial vehicle 110 will not be able to return to the predefined location in view of the return data information received. Additional examples corresponding to configuration and execution of a return path from the aerial vehicle 110 perspective are provided with FIG. 8 and FIG. 12.

It is noted that where there may be a local WiFi or cellular data connection, e.g., through the I/O subsystem 630, the data gathered from sources such as the internet can be used to update the route plan database 720, the avoidance database 740, and the return factors database 760. Moreover, with such data communication, the databases can be updated in real-time so that information may be updated and utilized during flight. Further, the updated data can be transmitted to the communication subsystem 360 of the aerial vehicle 110 in real time to update route or return path information (further described below) as it becomes available.

Figure 9:
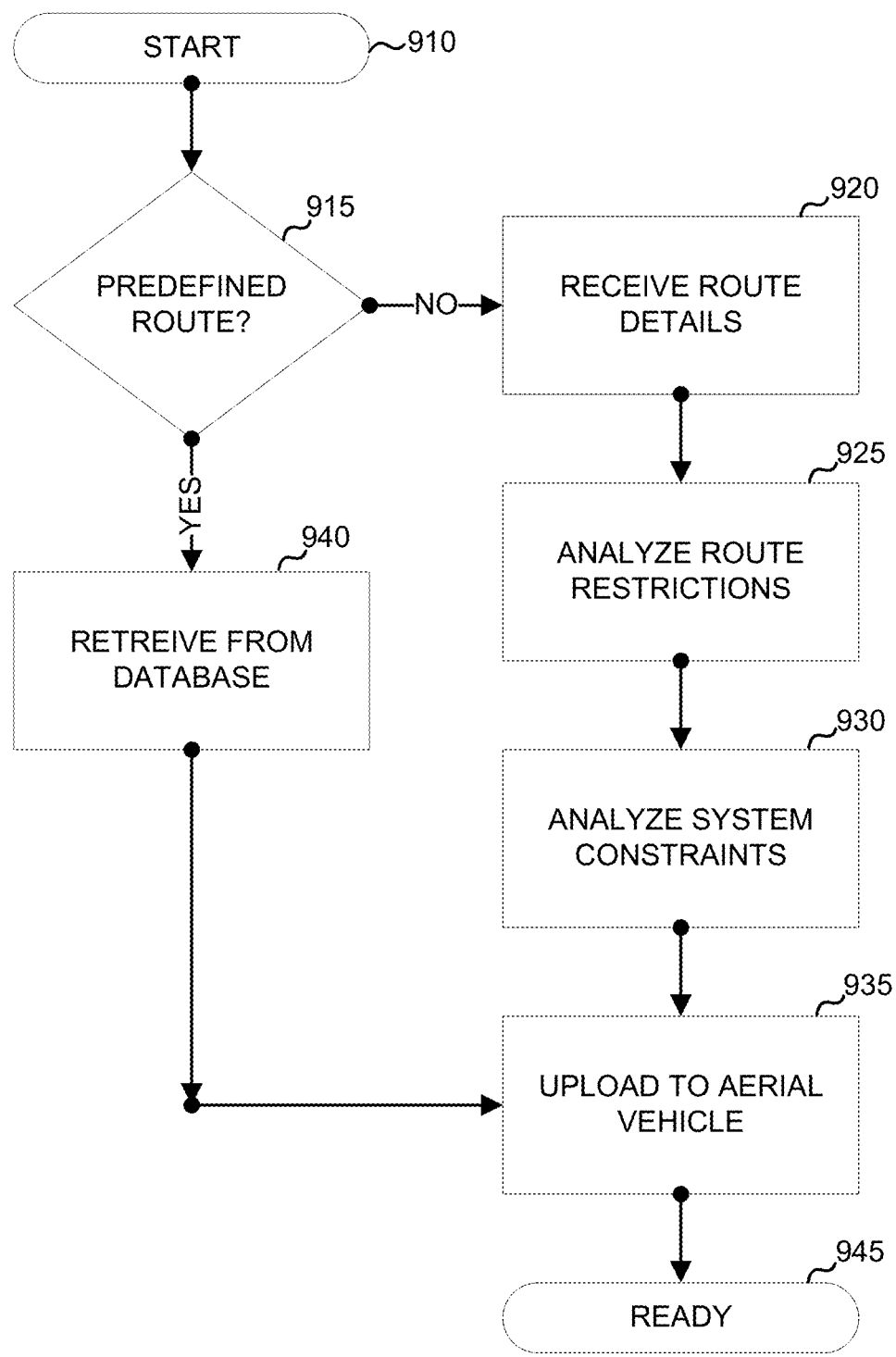
FIG. 9 illustrates a flow diagram for an example route plan operation on a remote controller.
Figure 10:
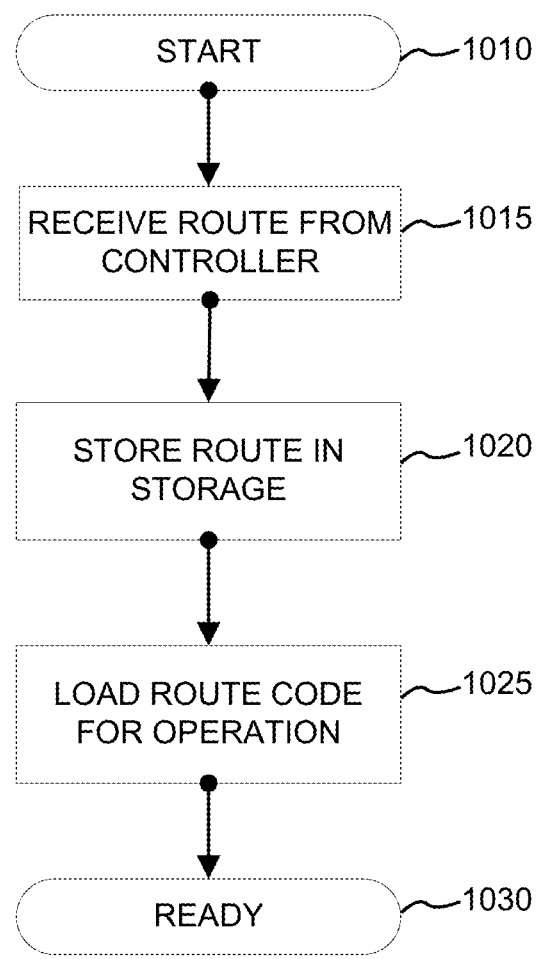
FIG. 10 illustrates a flow diagram for an example route plan operation load on an aerial vehicle.

Additional examples of route plan related configurations in the remote controller 120 are described with FIGS. 9 and 10. Turning first to FIG. 9, it illustrates a flow diagram for an example route plan operation on a remote controller 120. The process starts 910 with the remote control system 605 determining 915 whether there is pre-defined flight route (or path). If not, the process receives flight route details 920 using, for example, the planning module 710 and route planning database 720. The process analyzes 925 route restrictions using, for example, the route check module 730 and avoidance database 740. The process also analyzes 930 system constraints through, for example, the avoidance database and system check module 750 (e.g., battery life left on aerial vehicle 110). The process uploads 935 the route details to the aerial vehicle 110. The route also may be stored the route plan database 720 before being ready 945 for next actions.

If the process determines 915 that a predefined route will be used, that route plan can be retrieved from the route plan database 720. The retrieved route plan is uploaded 935 to the aerial vehicle 935. If adjustments are made to the retrieved route plan, the process may undertake the steps of analyzing 925 the route restrictions and analyzing the system constraints 930 before being uploaded to the aerial vehicle 935. The processes of analyzing 925, 930 may be iterative before upload and before being ready 945 for the next actions.

FIG. 10 illustrates a flow diagram for an example route plan operation load on a remote controlled aerial vehicle 110. The process starts 1010 with the flight controller 315 processing subsystem receiving 1015 the route information from the remote controller 120. The received route information is stored 1020 in a storage (e.g., memory and/or flash storage). When ready for execution, the process retrieves the stored route information and loads 1025 the route information and corresponding executable code for execution by the flight controller 315 processing subsystem. The aerial vehicle 110 is ready 1030 for flight using the loaded route information.

Example Pre-Flight Route (or Path) Mapping

There may be instances in which a user may seek to map out a flight route (or path) in advance by "tracing" the route in advance, e.g., on the ground or in the water, and having an option to augment this traced route to ultimately generate a flight route e.g., the flight plan control system 705. The traced route may have a positional coordinates (e.g., GPS coordinates) of a start location (start coordinates), one or more intermediate locations captured along the traced route (one or more intermediate coordinates), and an end location (intermediate coordinates) for the traced route.

By way of example, a user may walk a path that later will be used for the flight route (e.g., as part of a flight plan) for the aerial vehicle 110. In another example, a user may kayak on a river and have the aerial vehicle 110 follow the same path at a later time. Data for traced routes can be captured through sensors (which may include telemetric subsystems) that a user may carry, wear, or keep in close proximity, for example, via a trace device. A trace device may be a computing device that may have one or more sensors to capture data, for example, location data (e.g., positional coordinates such as GPS coordinates) and/or environmental data. Examples of a trace device may be a smartphone, a wrist tracking device, a sensor vest, a sensor helmet, a tracking device on a bicycle, kayak, or skis, etc. The captured data may be traced route data and can be used to configure the flight of the aerial vehicle 110 when operating.

Further, a user may "paint" a flight area by tracing the flight route in advance by engaging in an activity for the trace, for example, walking, biking, rowing, etc., and thereafter adding additional information to the traced route. The additional information added to the captured traced route data can be, for example, boundaries (e.g., identified by positional coordinates such as GPS coordinates) within the traced route, distance from the traced route, distance from a subject following the traced route, etc. For example, a mountain biker may trace a route along a bike path in advance and "paint" the traced route so that the aerial vehicle 110 will stay within just a few meters of that route. In this example, as the traced route may be narrow, so the additional information to paint the trace may include distance to maintain relative to the route when following the biker. This can help the aerial vehicle stay within a few meters of the user and not stray further than a couple of meters from the traced route. This may help avoid obstacles, for example, trees, poles, hillsides, rock walls, buildings, etc. Further in this example, the traced path may be rendered on a touch sensitive display of a trace device and the user may "draw" on the mapped path to add additional data. Alternately, or in addition, data parameter may be added via the capture device corresponding to the painted area.

Figure 7B:
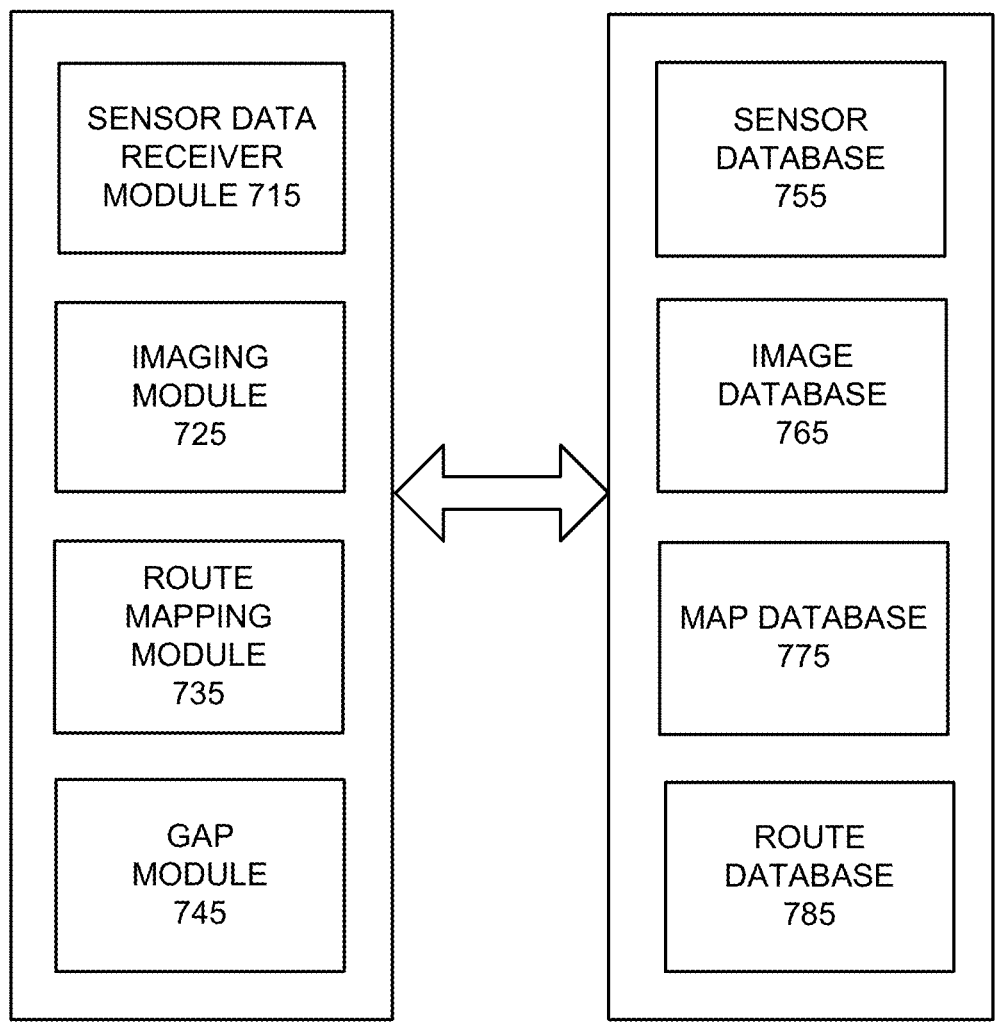
FIG. 7B illustrates a functional block diagram of an example pre-flight mapping system.

Referring now to FIG. 7B, it illustrates a functional block diagram of an example pre-flight mapping system 708. The pre-flight mapping system 708 includes processing modules and data stores. The processing modules comprise software code executable within a processing system and databases where data is stored and retrieved. The processing modules interface with the databases. The pre-flight mapping system 708 may be configured on the remote controller 120, which can function as a trace device using sensors within the remote controller 120 to collect data for a trace route. In some example embodiments the pre-flight mapping system 708 may be configured to receive data from other devices that may be used as a trace device (e.g., a camera, smartphone, tablet, smartwatch, fitness tracker, a vest, helmet, pedometer, etc.) that has one or more sensors that collect data that may be used for processing a traced route. In some example embodiments the pre-flight mapping system may be configured on the trace device itself.

The pre-flight mapping system 708 may include a sensor data receiver module 715, an imaging module 725, a route mapping module 735, and a gap module 745. The system 708 may also include a sensor database 755, an image database 765, a map database 775 and a route database 785.

The sensor data receiver module 715 may be configured to receive data from sensors on the trace device. The sensor data captured corresponds to the data at the points the user is physically at as the user is establishing a path by an activity they or a proxy (e.g., an animal or vehicle) are presently undertaking, e.g., walking, biking, skiing, kayaking or rowing along. Sensor data includes, for example, positional data, data from motion related sensors and environment related sensors. Examples of data from motion related data include global positioning data, accelerometer data, gyroscopic data, rotational vector data, etc. Examples of data from environmental related data include barometric data, temperature data, humidity data, etc. The received sensor data is stored in the sensor database 755.

The imaging module 725 may be configured to receive video captured by the trace device along the physical path the user is mapping by their activity. The imaging module 725 is configured to receive images that can be stored in the image database 765. The images can be used to provide image data that can be applied with the traced route. For example, the images can identify points of interest, obstacles, environmental conditions (e.g., light intensity), etc.

The route mapping module 735 may be configured to overlay sensor data and/or the image data with a map provided through the map database 775. For example, the traced route data may be overlaid on a map along with images captured from the traced route. The traced route data may correspond to the physical traced route the user or proxy undertook. The traced route data may be painted with additional information as previously described and may be painted onto the overlaid map. The overlay map may be a map that can be displayed on a screen, e.g., screen 170. Alternately, or in addition, the overlay map may be a mapped data (e.g., positional coordinates, altitude, direction, etc.) for a trace route and may include painted areas in which an aerial vehicle may fly to (e.g., location not captured through a sensor on the trace device) or fly within (e.g., boundaries).

The overlaid map (or overlay map) based on the traced route data (with or without the painted information) may be used to generate the aerial flight route data for the aerial vehicle 110. The flight route data has additional information as described below that can be particular for use by or with the aerial vehicle 110. Moreover, the flight route data can be applied to generate a flight plan for the aerial vehicle 110.

The flight route data is uploaded into the aerial vehicle 110. The traced route data and the flight route data can be stored in the path database 785 until it is ready for use (for example, it may be used with the remote controller 120 and uploaded to the aerial vehicle 110). It is noted that maps also may be retrieved from online sources, e.g., Google Maps, MapQuest, etc., in addition to or in lieu of the maps in the map database 775. Moreover, maps retrieved from online sources may be stored in the map database 775 for subsequent retrieval and use.

The gap module 745 may be configured to analyze the sensor data and/or image data overlaid on the map for the traced route data. The additional information from the gap module 745 can be used with the traced route data helps to generate the flight route data. By way of example, the gap module 745 analyzes the sensor data and/or image data to extrapolate additional information corresponding to the aerial flight route the aerial vehicle 110 can take. The gap module 745 can fill in "gaps" in the data that are not captured from the traced route a user has physically mapped. For example, the image data may show an obstacle that is to be avoided by the aerial vehicle 110 or a user may tag particular obstacles or off the path routes to fly over (e.g., an area over a body of water to which the user was unable to walk to). The gap module 745 can calculate additional traced route information corresponding to how the flight route is to be appropriately modified and can add this information for the flight route data. Additional data for the gap module 745 may come from the information a user "paints" on the traced map.

It is noted that the gap module 745 may store information specific to the aerial vehicle 110, e.g., size, weight, power information and the like, that also could be used for the gap analysis. This additional data for the flight route data to be generated can include parameters entered by a user corresponding to information associated with the route. It may include, for example, knowing flight time available on a full battery charge to determine whether sufficient power exists to fly along a full aerial flight route corresponding to the traced route.

Figure 7C:
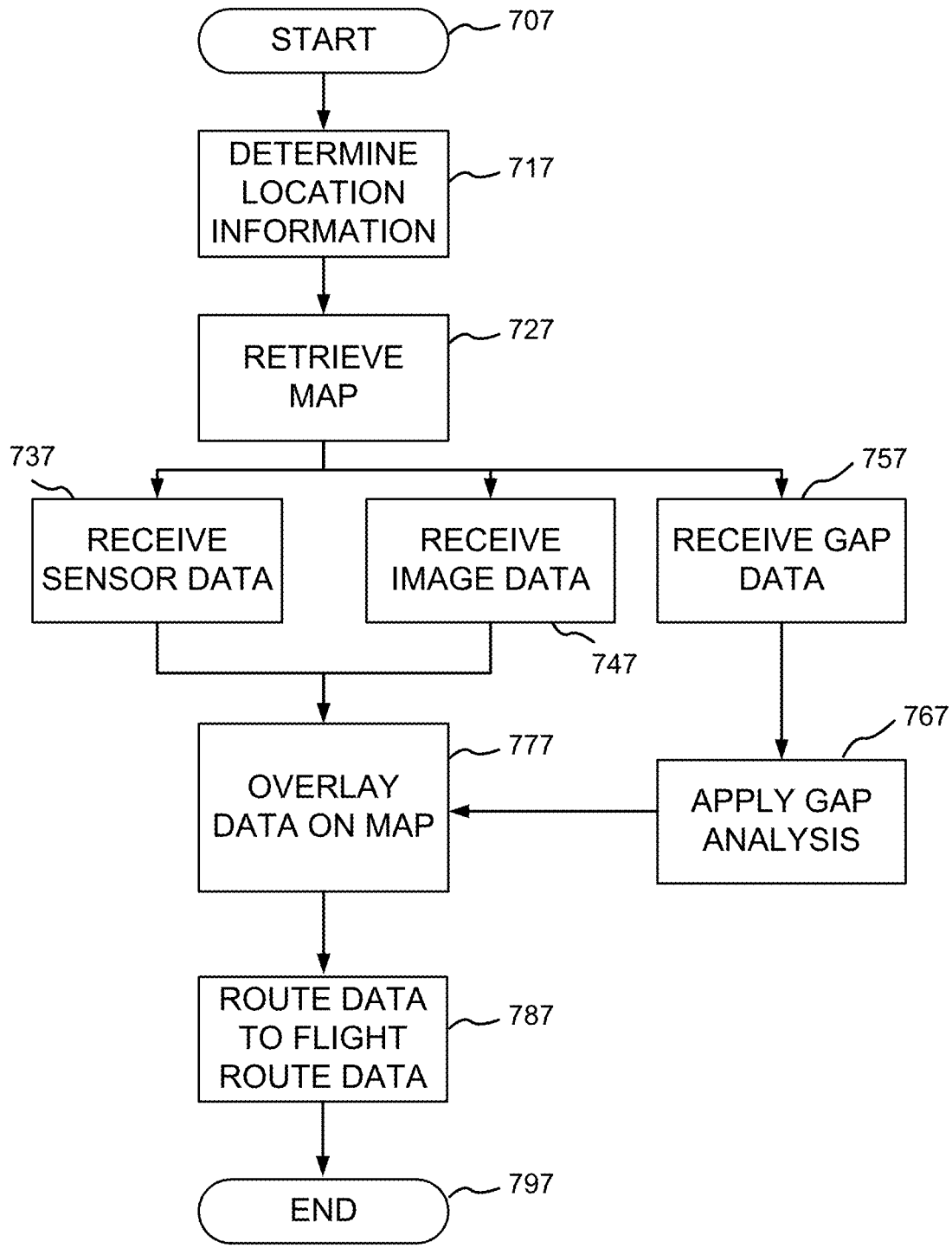
FIG. 7C illustrates an example process executed by the system for preparing an aerial path for the aerial vehicle by physically movement along a potential flight route (or path) in advance.

FIG. 7C illustrates an example process executed by the system 705 for preparing an aerial flight route for the aerial vehicle 110 by physical movement along the route in advance (e.g., via walking, running, biking, kayaking, rowing or other physical movement by an object). The process captures data through the trace device as previously noted and may use a computing device to assemble the trace path data for use by the aerial vehicle for the flight route.

The process starts 707 with the computing device determining 717 location information. The location information is received through the sensor data receiver module 715. The data received can be data captured through the global positioning system (GPS) sensor of the trace device and can include start and end point location information as well as captured location information in between. With the location information determined 717, the process retrieves 727 a corresponding map to that location, e.g., from the map database 775. As noted previously maps may also be retrieved from online sources, for example, Google Maps, MapQuest, etc.

The process can receive 737 sensor data through the sensor data receiver module 715. The sensor data can be from the various sensors on the trace device for various points along the physical route taken by the user. For example, the data received can include altitude data, accelerometer data as well as barometric data, temperature data, and humidity data. Each of these can be a factor for use by the aerial vehicle 110 in determining its configuration for the flight route.

The process receives 747 image data through the imaging module 725. The image data can correspond to images captured along the route that could be used as a part of the process of mapping the route. The received image data may provide additional information about to the route, for example, terrain related data, e.g., foliage density, building presence, etc.

The process can receive 757 gap data through the gap module 745. The gap data can correspond to additional details of the physical path that may be of relevance for the aerial flight path followed by the aerial vehicle 110. For example, a user may enter data, e.g., an image, corresponding to an obstacle. In this example, the image may show an obstacle to be of a set of rocks having a wide opening. The physical route may show as the rock being insurmountable such that the aerial vehicle 110 would have to fly around it. If the opening appears to be sufficiently wide, the user may take an image of the opening, which is received image data via the imaging module 725. The imaging module 725 focuses the image to the gap module 745, which applies 767 a gap analysis based on the image, associated meta data, and potentially other sensor data. The gap analysis from the gap module 745 may determine that the aerial vehicle 110 may fly through the opening rather than around the opening and can use the sensor data to plot the appropriate point or points to fly (e.g., GPS coordinate and elevation coordinates). As the system 705 can have access to, and provides information on, terrain and environment data, it may be that the applied 767 gap analysis determines the opening cannot be traversed by the aerial vehicle 110. In this example, information on the terrain, environment and other received data may be used by the gap module 745 to plot coordinates on the map (location data (or points)) that appear to provide for a clearer route for the aerial vehicle 110 even if the user works their way through the opening.

It is noted that, although not shown, the system 708 could also include a sonar module that could use sonar to detect obstacle in the physical path and provide for alternate routing on the map. For example, foliage density may need to be taken into account with altitude to determine at what height to fly the aerial vehicle 110. Moreover, it is noted that certain data may be overridden by settings of the aerial vehicle 110, e.g., altitude and/or flight height ceiling restrictions or flight boundaries restrictions that may be programmed into (or with) the aerial vehicle 110 flight control system. Additional details for flight controls are described below.

The data received from the sensor data receiver module 715, imaging module 725, and gap module is overlaid 777 on the map by the route mapping module 735. The combination of the data and map generates the route data. The route data is a route map and may correspond to (or be converted to) the aerial flight route that will be transmitted 787 to the aerial vehicle 110. The generated route data can be positional coordinate points and surrounding environmental data points. The correspondence may not only provide for coordinate such as GPS location coordinates, but also may provide data such as altitude and obstacles information.

It is noted that the route data could be edited by the user on the computing device if the user desires. For example, the user may add points along the aerial flight route that the user did not physically go to, e.g., a landmark that the user could not walk to, for the aerial vehicle 110 to fly to in the flight route. This is another example of painting data on the collected trace data.

The traced route data along with the information from other sources, e.g., image data, sensor data, gap analysis, can be combined to generate the flight route data. The flight data can be transmitted 787 to the aerial vehicle 110 via the remote controller 120 described previously, e.g., through the planning module 710, and/or can occur through a direct communication channel between the computing device and the aerial vehicle 110, e.g., through a route plan module 810 described with FIG. 8.

It is noted that the flight route data can be uploaded either directly or indirectly, e.g., through the remote controller 120 or other computing device, into the aerial vehicle 110. The flight route may be followed by the aerial vehicle 110 in an autopilot mode or in conjunction with input provided through the remote controller 120. The flight route data also can be used by the remote controller 120 to guide the aerial vehicle 110 in flight.

Accordingly, by being able to physically chart a route, a user can later have that route imaged by the aerial vehicle along substantially the particular route taken by the user. Hence, the user has greater operational flexibility with the aerial vehicle 110 as the user is able to, for example, "scout" flight locations physically before having the aerial vehicle follow the same route. This can improve the experience of flying an aerial vehicle 110 because a user is able to determine issues like obstacles or landmarks for the aerial vehicle to navigate along the path in advance of flying the aerial vehicle 110. Moreover, if multiple users are capturing route data at the same location, the process may allow for superimposing the multiple path data points to generate an aerial route map that accounts for multiple points of view.

Example Flight Control System for Aerial Vehicle

Figure 8:
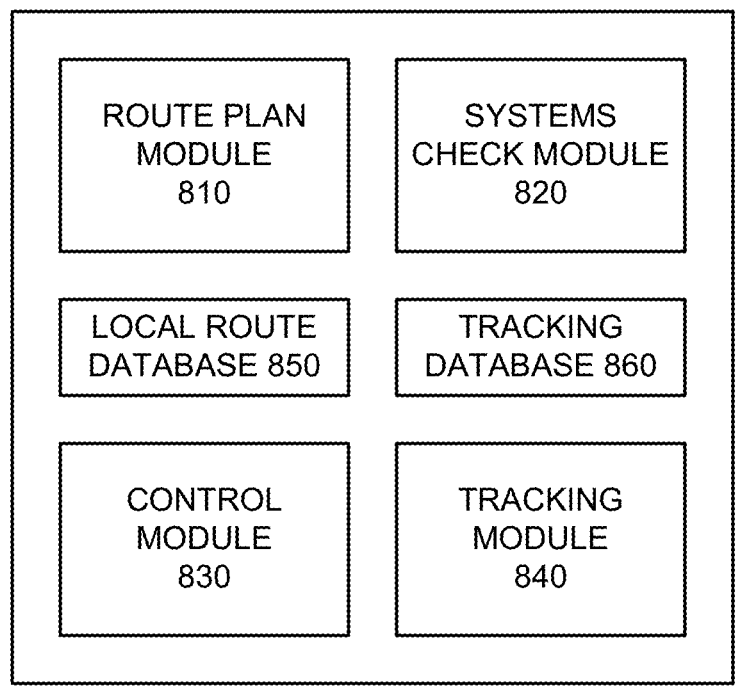
FIG. 8 illustrates a functional block diagram of an example aerial vehicle flight control system for an aerial vehicle.

Turning now from the flight plan control system configuration of the remote controller 120 to the aerial vehicle 110, reference is now made to FIG. 8. FIG. 8 illustrates a functional block diagram of an example flight control system 805 for an aerial vehicle, e.g., 110. The flight control system 805 includes a route plan module 810, a systems check module 820, a control module 830, tracking module 840, a local route database 850 and a tracking database 860. It is noted that the modules may be embodied as software (including firmware) comprised on program code (or software or instructions) stored in a storage medium and executable by the flight controller 315 processing subsystem of the aerial vehicle 110.

The route plan module 810 can be configured to execute a flight route (or path) for the aerial vehicle 110. The route plan may be one uploaded from the planning module 710 of the remote controller via the communication subsystem 670. Alternately, the flight plan may be transmitted from the remote controller 120 and received by the aerial vehicle 110 route plan module 810 for execution in real-time during flight. The flight plan can be configured to provide a predefined "band" within with the aerial vehicle 110 is controlled so that certain operational commands received from the remote controller 120 may be prohibited from execution. For example, the band may limit the aerial vehicle 110 from flying above a predefined altitude or beyond predefined boundaries provides by GPS coordinates.

The systems check module 820 can be configured to monitor operational systems of the aerial vehicle 110 and flight environment and terrain sensor data captured by the aerial vehicle 110 when in operation. Monitoring may include receiving and/or retrieving information from sources on the aerial vehicle, for example, subsystems described in FIG. 3. Before the flight route is executed, the systems check module 820 receives information of initiation of a flight mode. The flight mode may correspond to triggering operation of appropriate system components, e.g., as described with FIGS. 3 and 4, to enable the aerial vehicle 110 for flight. The systems check module 820 identifies the operational systems of the aerial vehicle to ensure safety and correctness before executing the flight plan. The operational systems information may include information related to flight of the aerial vehicle 110, for example, remaining battery power, mechanical structural integrity and operation, and electrical operation. Continuing with this example, if all the arms 135 are not properly extended in a "locked" position for flight (e.g., via a sensor where each arm 135 couples with the housing 130 or electronic connection from the arms 135 to a sensor system or some combination thereof), the systems check module 820 detects this information. The systems check module 820, through the flight controller 315, may provide notification of this possible operational issue, for example, via lighting an LED 410 on the aerial vehicle 110 and/or transmitting this information via the communications subsystem 360 to the remote controller 120 to provide notification via the display 170 of the remote controller 120. By way of example, when the arms are not locked, the system check module 820 may have the power subsystem 340 (e.g., via the flight controller 315) disable power supply to the thrust motor electronics 325. Also by way of example, the system check module 820 may disable, e.g., through the flight controller 315, received control signals from the remote controller 120.

Continuing with the systems check module 820, the flight environment and terrain sensor data can correspond to data from the sensor subsystem 335 of the aerial vehicle 110, for example, temperature, moisture, wind speed and/or direction, object detection as well as GPS position, altitude, and directional heading data. The information monitored by the systems check module 820 may be transmitted to the remote controller 120, which can display this information through a user interface rendered on the display 170.

The control module 830 can be configured to control operation, e.g., movements, image capture, etc., of the aerial vehicle 110 when it is in flight. The control module 830 is configured to receive control commands from the remote controller 120. The received commands may be, for example, generated via the control panels 150, 155 and transmitted from the communication subsystem 670 of the remote controller 120. The received commands are used by the control module 830 to manipulate the appropriate electrical and mechanical subsystems of the aerial vehicle 110 to carry out the control desired.

The control module 830 also interfaces with the route plan module 810 and the systems check module 820 to ensure that the control commands to be executed are within the permissible parameters of the flight plan (e.g., based on the flight route data) provided by the route plan module 810. For example, if a command would cause the aerial vehicle 110 to fly into a restricted area, the control module 830 may be configured to execute a "hover" command to have the aerial vehicle 110 hover in place and not execute the command. The control module 830 also may be configured to have a message transmitted, via the flight controller 315 and communication subsystem 360 to the remote controller 120, to the remote controller 120 for display on its screen 170 information on why the command cannot be executed.

When the aerial vehicle 110 is in flight, there may be instances in which early detection of potential problems, e.g., obstacles, weather, etc., could be beneficial so that course modifications can be taken when necessary and feasible. Accordingly, the control module 830 also may be configured to make course changes in view of receiving information from the systems check module 820. The information from the systems check module 820 may indicate that such course correction is necessary, for example, to navigate around an object detected via the sensor subsystem 335 and/or analyzed from received images captured by the camera 450. In making these changes, the control module 830 may work with the tracking database 860 to update the local route database 850 to identify location of objects and/or identify areas of flight that may be identified for avoidance for other reasons, e.g., weather conditions, electronic interference, etc. This information may be used for tracking by the tracking module 840. Further, the information may be later downloaded to the avoidance database 740 of the remote controller 120 for use with future flight plans that are created or updating existing flight plans. The information collected and stored in the tracking database 860 also may be used for operations such as a return path, as further described below.

Other example course changes may occur due to environmental conditions. For example, if wind speed exceeding a threshold at a particular altitude, the control module 830 can be configured to move the aerial vehicle 110 to a lower altitude where wind may be less of an issue. This movement may occur despite not receiving such control information from the remote controller 120.

The tracking module 840 can be configured to track of the flight of the aerial vehicle 840. The tracked flight data may correspond to positioning data, e.g., GPS coordinates, altitude data, etc., collected at predetermined time periods (e.g., sampled data) as the aerial vehicle 110 is in flight. The tracked flight data may be analyzed as corresponding to a "clear" route of flying as the aerial vehicle 110 is, or was, in flight. The tracked flight data may be stored in the tracking database 860. Additional data, e.g., obstacle data, may be stored in the local route database 850. The tracking module 840 may be used to retrieve the route the aerial vehicle 110 actually took and use that data to track back to a particular location.

As an example, the tracked flight data and the obstacle data may be used to generate a clear path. The clear path may correspond to a flight path the aerial vehicle may use, for example, for a return to home operation. For example the clear path may be used by the return path previously described. The generated clear path may remove redundant location tracking information from the tracked path, e.g., due to maneuvers such as a "loops" or multiple "fly by" operation path a point. The generated clear path also may account for the obstacle data by tracking location data for avoiding and/or maneuvering by the obstacle. The control module 830 may check with the tracking module 840 on a return path for the aerial vehicle 110 to identify a location along the clear route where the aerial vehicle 110 can be set down (e.g., grounded) as quickly as possible. Where to set down along the clear route may be based on data from the systems control module 820, e.g., amount of battery power remaining and/or distance to travel for execution of a return path.

By way of example, use of the clear path may be of interest in situations in which the aerial vehicle 110 needs to be set down (or land) as quickly as possible and/or execute a return path (e.g., return to home) as previously described. For example, if the systems check module 820 detects an impending power, electrical or mechanical issue that may affect further flying of the aerial vehicle, it may instruct the control module 830 to configure itself into an override mode. In the override mode, the control module 830 may limit control signals received for operation of the aerial vehicle 110 from the remote controller 120. Examples of control signals may include signals to control fine operations that may be helpful for further flight guidance or landing. In some example embodiments of an override mode the control module 830 may cut off (or set aside) control signals from the remote controller 120, for example, if so configured by the user or if control signals received may affect proper operation of the aerial vehicle 110.

The route plan module 810, control module 830 and/or tracking module 840 provide for a return path that may have been preprogrammed from the flight plan, but thereafter modified with information picked up during flight of the aerial vehicle 110 and stored during flight. For example, during flight, the sensors on the aerial vehicle 110 may detect obstacles that should be avoided, but were in the pre-programmed return path. The detected obstacles and/or corresponding location data of that obstacle can be stored in the local route database 850. When the route plan module 810, control module 830 and/or tracking module 840 execute the return path operation on the aerial vehicle 110, the return path program can be retrieved. The data can be extracted corresponding to obstacles (or other avoidance data) that were detected and stored during flight and now determined to be in the return path. The return path program may be revised to adjust for those obstacles (e.g., changes flight path to clear object) and the modified return path can be executed so that the obstacles are avoided on the return path. Moreover, this return path data can be downloaded to the return factors database 760 previously described for potential later use when new flight route plans are developed or current flight route plans are updated.

The disclosed configuration beneficially implements an intelligent return to home behavior for the aerial vehicle 110. The return to home configuration may use a return path that is a direct from a current location to a predefined location. Alternately, or in addition, the direct route may incorporate in obstacle avoidance. By way of example, assume during flight the aerial vehicle 110 flies around (or avoids) a tree. This data is stored in the aerial vehicle 110. Later, if a "return to home" (or "come home") button is selected on the remote controller 120, the aerial vehicle 110 return path tracks back along the direct route, but avoids flying directly into a tree, which is identified as an obstacle. Hence, the disclosed configuration return path can track back along what may be a clear path on the way back because such path avoided obstacles. In addition, the clear path may be direct path from a current location to a predetermined location (e.g., an initial take off location and/or initial location where data was captured) and may avoid redundant points along the route (e.g., multiple passes around a tree or building). The clear path may be saved within the aerial vehicle. In some example embodiments, in addition to obstacle avoidance, the return path program may use a direct route back to the predefined location to land or a place to land along that route that is determined to be clear. Landing at a place other than the predefined location may be due to other factors coming into consideration, for example, if battery power is insufficient to return to predefined location or mechanical integrity would prevent return to predefined location.

Figure 11:
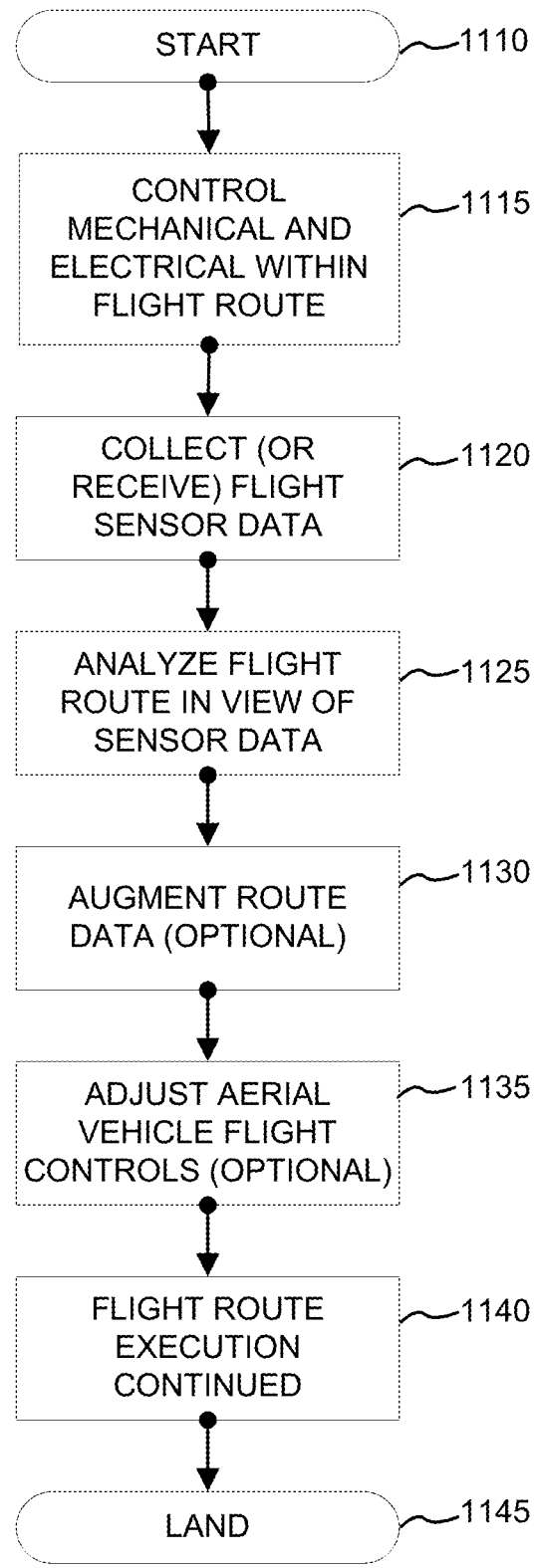
FIG. 11 illustrates a flow diagram for an example route plan operation on an aerial vehicle.

Additional example details for route plan operation on the aerial vehicle 110 are described with FIG. 11. Turning to FIG. 11, it illustrates a flow diagram for an example route plan operation on the remote controlled aerial vehicle 110, e.g., through the flight controller 315. The process starts 1110 with control information being received from the remote controller 120 through the communication subsystem 360 of the aerial vehicle 110. The control information is processed by the flight controller 315 to control 1115 the mechanical and electrical components of the aerial vehicle 110 within the context of the programmed flight route. The sensor subsystem 335 collects (or receives) 1120 flight data information from sensors on board the aerial vehicle 110. This data is analyzed 1125 by the systems check module 820. The control module 830 may augment 1130 the analyzed data based on other information to modify the route, e.g., detection of an object by the sensor subsystem 335 or image analysis of an image captured by the camera 450. In such instances the aerial vehicle 110 flight controls may be adjusted 1135 by the control module 830. When the flight path is completed 1140, the aerial vehicle 110 may continue to fly within the parameters of system operation and flight route until the aerial vehicle 110 lands 1145. It is noted that the aerial vehicle 110 will not land within locations predefined as "no land zones." In such situations, a user of the remote controller 120 will continue to fly the aerial vehicle 110 to an area where landing 1145 is permitted.

In some example instances, the aerial vehicle 110 may land in a location that is not visible. In such instances, the aerial vehicle can be configured to use existing power or a reserve power source, e.g., a battery backup, to transmit its location. For example, the aerial vehicle 110 can be configured with a location based service module that transmits coordinates, e.g., global positioning system (GPS) coordinates, back to the remote controller 120 through, for example, a long range WiFi connection or mobile telecommunication network. If the GPS coordinates of where the aerial vehicle 110 lands are unknown, the last known GPS coordinates can be transmitted back. The GPS coordinates also can be transmitted to a cloud service, for example, via WiFi or mobile telecommunication network. This information can be stored in a preconfigured cloud service with which the aerial vehicle 110 and/or mounted camera is registered in advance. The GPS coordinates also can be sent to other designated locations, for example, a mobile telephone number (e.g., text or recorded voice of coordinates), messaging service, or electronic mail. Each of these can be configured within a service, e.g., cloud based service, with which the aerial vehicle and/or the camera are registered.

It is noted that in some embodiments the GPS coordinate information can be overlaid or augmented onto a map and the combination of information can be sent to, for example, the remote controller 120, cloud service, and/or a mobile device or computer to further assist in locating the aerial vehicle 110 upon its landing. In an embodiment, location information may be automatically sent (e.g., via email or text) to designated parties within an area of the lost aerial vehicle together with a map link to help the owner organize a search party.

In addition, there may be example instances in which an operator of the aerial vehicle may seek to make location information, e.g., GPS coordinates, known to other entities. For example, the location information can be used by a service based organization to allow for tracking and or location (e.g., find my aerial vehicle) such as in instances where remote diagnostics may be necessary or if other communication links could be augmented, e.g., triangulation, in locating a landed aerial vehicle 110.

Example Return Path Execution by Aerial Vehicle

Figure 12:
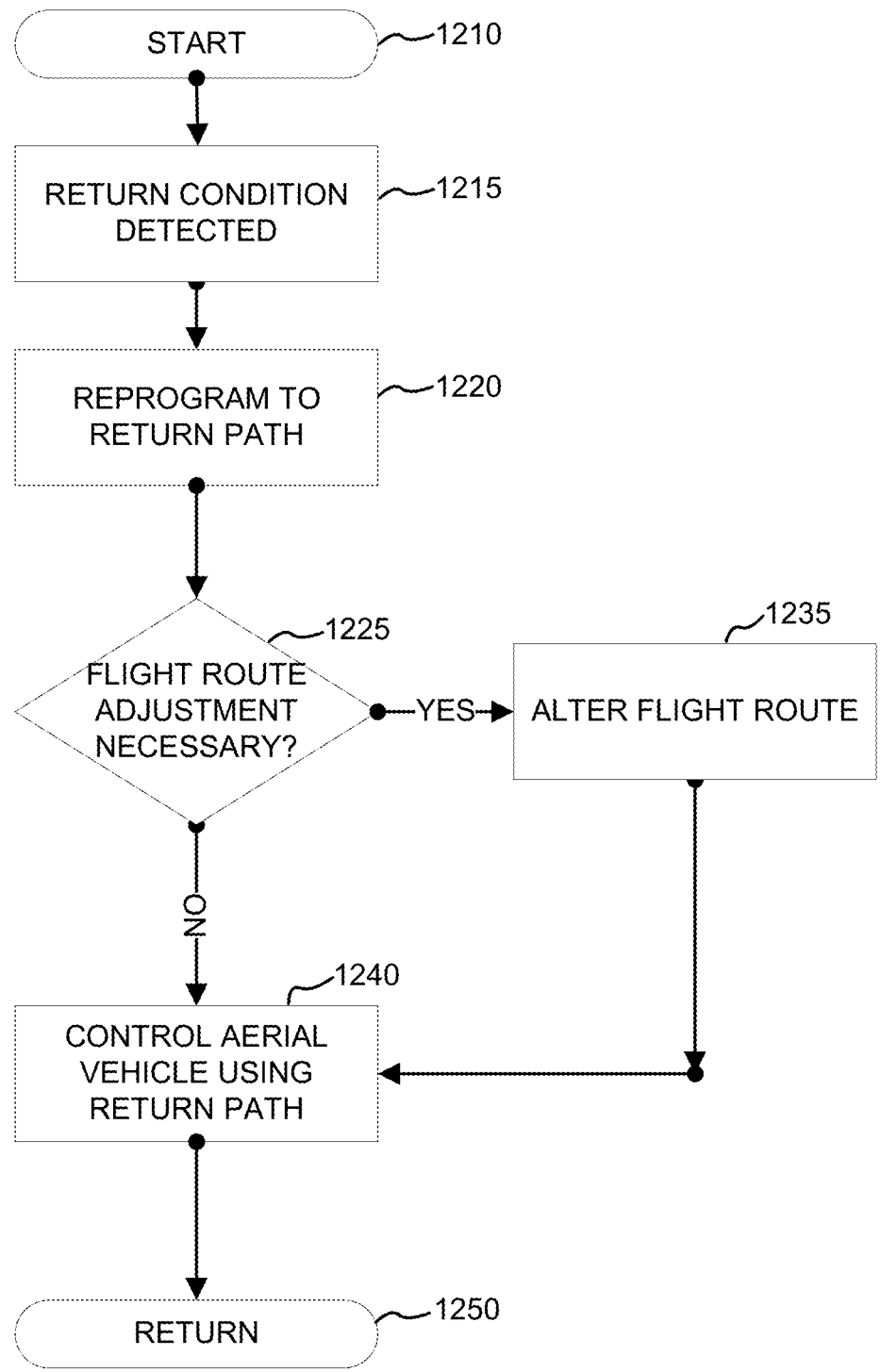
FIG. 12 illustrates a flow diagram for an example return path operation on an aerial vehicle.

Previously, examples were provided for an aerial vehicle return path, for example, configuration parameters for a return path. FIG. 12 illustrates a flow diagram for an example return path operation on a remote controlled aerial vehicle 110. The return path may be executed due to voluntary action, e.g., user selection of the return button 165 on the remote controller 120, or through involuntary action. Involuntary actions may include system related issue on the aerial vehicle 110, for example, low battery power or mechanical or electrical issues. The involuntary actions may also be triggered from positional and/or environmental concerns, for example, flying beyond a defined boundary or area, climatic issues (wind), or physical considerations such as object density. The aerial vehicle monitoring may be set up through the return factors database 760 and monitored for triggering of a return condition through the system check module 820, which can work in conjunction with the control module 830 to trigger a return mode.

In this example, process starts 1210 by detection 1215 of a return condition, for example, the systems check module 820. The control module 830, in conjunction with the route plan module 810 triggers a reprogramming 1220 of the aerial vehicle by executing a return path program. The control module 830 may work in conjunction with the route plan module 810, which may have preprogrammed coordinates of a return location, and/or the tracking module 840, which includes information on possible return path accounting for potential obstacles as may have been logged in the local route database 850 during flight of the aerial vehicle 110. It is noted that in some embodiments the aerial vehicle 110 also may have tracked "clear" areas during flight and stored those locations in the tracking database 860. Thereafter if the return path is triggered, either manually or automatically, the "cleared" location data points are retrieved from the tracking database 860. Obstacle data from the local route database 850 also may be retrieved. The data retrieved is used to help generate a return flight path that the control module 830 and the route plan module 810 can execute. This configuration may be beneficial, for example, if no return path is programmed or circumstances do not allow for return to precise "home" location for set down.

As the return flight path is executed and the aerial vehicle 110 is now changed to operate in that mode, the control module 830 may override control information arriving from the remote controller 120. If there are flight adjustments 1225, the process alters the flight route 1235 according to information stored and processed by the tracking module 840 and the tracking database 860 and local route database 850. The control module 830 controls 1240 the aerial vehicle back to the return location 1250. The return location 1250 may be identified in the route plan module 810 (original route plan may include coordinates for return location), or may use the location of the remote controller 120 (using its GPS location as a tracked beacon), or may identify an intermediate point as determined through the local route database 850 and/or the tracking database 860 in conjunction with the tracking module 840 and the route plan module 810.

It is noted that other operational scenarios may trigger a return flight path. For example, the systems check module 820 may closely monitor maintenance of a communication link between the communications subsystem 360 of the aerial vehicle 110 and the communication subsystem 670 of the remote controller 120. A loss of a communication link between the communications subsystem 360 of the aerial vehicle 110 and the communication subsystem 670 of the remote controller 120 may be indicative of a need to trigger the return path. In this example, the system can be configured so that if communication link has been severed, the systems check module 820 notifies the control module 830 to try to reestablish the communication link. If the communication link is not established within a predefined number of tries or a predefined time period, the control module 830 will trigger the start of the return path as described above.

The disclosed configuration may reduce or remove aspects of flight behavior of the aerial vehicle that would be unnecessary for a return path. For example if the aerial vehicle 110 flew several loops around a tree, it may be undesirable to backtrack all of the loops when on a return path. Accordingly, the aerial vehicle 110 is configured to mark areas as "clear" (i.e., areas that are clear can then be identified through "clear breadcrumbs") as the aerial vehicle 110 is in flight. The clear path may be generated, for example, by removing location data (e.g., GPS) of the tracked flight path that may be redundant and/or accounting for obstacle data that may have been collected so as to avoid those obstacles. Further, it may be a direct flight path from a current location of the aerial vehicle to a predetermined location (e.g., initial take off location). The data corresponding to "clear" can be assembled into a graph for use in a return path. Thereafter, if the aerial vehicle 110 needs to come back (e.g., execute a return path) to the starting location the aerial vehicle 110 can take the shortest path through the graph of the cleared areas. This information can be stored and used through the control module 830 and/or the tracking module 840. Hence, if the aerial vehicle 110 flew several loops and figure eights and they intersect, the control module 840 can make connections at those points, build a graph corresponding to the points in that flight, and take a shortest path through cleared area back to a return point, for example, by removing redundant location data collected along the flight path. The process also may use an initial take off location of the aerial vehicle (e.g., where the aerial vehicle started flying from) as the return location.

Example Following Configurations for Aerial Vehicle

The aerial vehicle 110 also may include a tracking module for following (or tracking) an object, for example, a person riding a bicycle, skiing on a slope, surfing on a wave, or skating in a skate park. It is noted that the object need not be limited to a person and could be other objects, for example, a dog, cat, bird, etc. The object also could be an inanimate object that is moving, e.g., a vehicle, a boat/ship, a robot, another remote controlled object, etc.

One embodiment of a tracking module (may be a part of the control electronics of the housing of the aerial vehicle) may use a GPS over (or with) radio frequency (RF) configuration. However, such configurations can be augmented to further enhance tracking. The aerial vehicle 110 also can incorporate (or independently use) a vision module. The vision module comprises software and/or hardware and is configured to receive images and apply machine vision to analyze the images for particular application. For example, the vision module receives images captured by the camera 450 along with other sensor data, e.g., environmental data collected from a barometric sensor, humidity sensor, and/or temperature sensor, to determine an parameters to apply for control of the aerial vehicle 110 based on the activity undertaken, e.g., biking, skiing, surfing, and/or skating.

By way of example, an activity may be pre-programmed into aerial vehicle 110 through the planning module 710 of the remote controller 120. Based on the activity, the planning module 710 can forward the data to the vision module. The vision module can be configured in the aerial vehicle 110. The vision module can use the activity information along with data collected on board the aerial vehicle, e.g., from the sensors, to configure additional aspects of control operations for the aerial vehicle 110. Examples of the additional configuration for the aerial vehicle 110 include maintaining a minimal and/or maximal radial distance to keep from the object or having a primary position from which to have the aerial vehicle track the user. Further in this example, a light sensor on the aerial vehicle determines where the greatest sunlight intensity is originating and uses this information with the vision module to position the aerial vehicle 110 so that the light remains to the back of the camera 450 location. By way of another example, in a skiing scenario the vision module can program the aerial vehicle 110 to primarily follow (direction of the camera 450) the skier from behind while in a surfing scenario the aerial vehicle 110 would be programmed to follow (direction of the camera 450) the surfer from the front. In particular, by way of example, the vision module may analyze facial features or body silhouette of the user to be tracked.

The aerial vehicle 110 also can be configured to hover, e.g., as an "aerial tripod", in more contained settings such as a skateboard park where multiple users could be separately followed. As the vision aspect can use facial or object recognition to ensure that the object being followed is indeed the correct object to follow, multiple objects can be programmed for following and who is followed can be set from, for example, the remote controller 120.

FIGS. 9-12 provide additional example operational processes of the systems describe above.

Example Image Applications

As images are captured through the camera 450 coupled with the aerial vehicle 110, the images can be transmitted back to the remote controller 120. Images also may be transmitted to other sources, such as a cloud service (e.g., a storage area in the registration system). The images also can be transmitted to other devices, for example, a computing device. The transmitted images may include metadata such as the sensor metadata and can be displayed within a dashboard, e.g., as described with FIG. 13. In some example applications, the images can be transmitted to a virtual reality viewing device. The virtual reality viewing device can be a dedicated device or a mobile phone used with a virtual device viewer, e.g., GOOGLE CARDBOARD. In such instances, the images can be transmitted to a software program that creates virtual reality images from the images received from the camera 450 on the aerial vehicle. As such the viewer can presented with a view from the aerial vehicle itself as it is in flight.

Example Remote Controller User Interface

Figure 13:
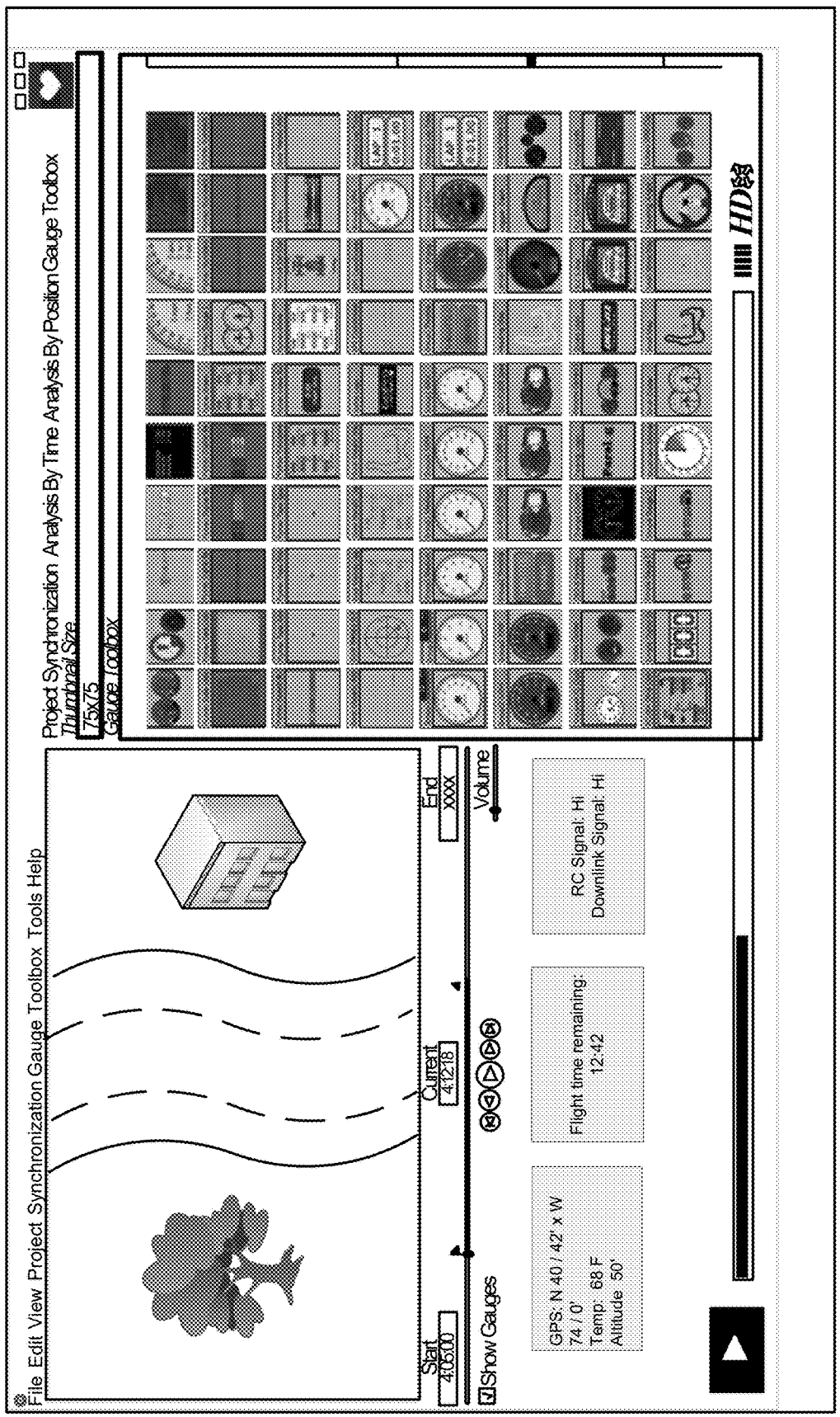
FIG. 13 illustrates an example user interface for a remote controller.

FIG. 13 illustrates an example user interface 1305 for use with the remote controller 120. The user interface 1305 is configured for display (e.g., provided for display and/or rendered) on the screen 170 of the remote controller 120. In this example, the user interface 1305 corresponds to a "dashboard" for the aerial vehicle 110. In one embodiment, the remote controller 120 receives, e.g., via the I/O subsystem 630 and/or communications subsystem 670, sensor data logged by the sensor subsystem 335 (and transmitted via the communication subsystem 360) of the aerial vehicle 110 as it is in flight. In one example embodiment, the aerial vehicle 110 can incorporate the sensor data with images that are transmitted back to the remote controller 120 in real time. The received sensor data is extracted from the image data stream and incorporate into predefined templates for display with the images on the screen 170 of the remote controller 120. The sensor data also may be transmitted separate from the images from the aerial vehicle 110 to the remote controller 120. Moreover, sensor data and/or other metadata obtained from the remote controller 120 and/or the camera 450 also can be provided for display. This additional data can augment and/or supplement the sensor data and other metadata received from the aerial vehicle 110.

Synchronization methods, such as time and/or location information, also can be used to synchronize the sensor data with the images at the remote controller 120. This example configuration allows a user, e.g., operator, of the remote controller 120 to see where the aerial vehicle 110 is flying along with corresponding sensor data associated with the aerial vehicle 110 at that point in the flight. Further, if the user is not interested in sensor data being displayed real-time, the data can still be received and later applied for playback with the templates applied to the images.

The predefined templates can correspond with "gauges" that provide a visual representation of speed, altitude, and charts, e.g., as a speedometer, altitude chart, and a terrain map. The populated templates, which may appear as gauges on screen 170 of the remote controller 120, can further be shared, e.g., via social media, and or saved for later retrieval and use. For example, a user may share a gauge with another user by selecting a gauge (or a set of gauges) for export. Export can be initiated by clicking the appropriate export button, or a drag and drop of the gauge(s). A file with a predefined extension will be created at the desired location. The gauge to be selected and be structured with a runtime version of the gauge or can play the gauge back through software that can read the file extension.

In another example, the remote controller 120 and aerial vehicle 110 may include integrated applications for flying the vehicle 110 without necessarily capturing images or having an attached camera. For example, in one embodiment, the remote controller 120 may include a built-in application providing a pre-defined flight pattern laid out on a map, and challenging a user to fly the aerial vehicle 110 around a particular course. The application may track the flight time and store the user's best time. Furthermore, the remote controller 120 may synchronize with other remote controllers controlling different aerial vehicles to facilitate races between the vehicles around the course. For example, the remote controller 120 may show the different vehicles' positions in real-time as they race around the course.

Example Registration System

In one embodiment, the system configuration 100 can include a registration system, which may be a cloud based registration system. The cloud based registration system allows for uploading identification information corresponding to the aerial vehicle 110, remote controller 120, gimbal 210, and/or the camera 450 coupled with the aerial vehicle 110. The registration information can include a serial number (or other identifier) associated with the specific component, i.e., aerial vehicle 110, remote controller 120, and/or camera 450, and also include additional identification information, for example, a name, address, telephone number, email, and/or messaging identifier associated with the registration, e.g., an owner and/or operator of the components. Once registered in the cloud the system can be further configured to include the registration information in a storage of the aerial vehicle 110, remote controller 120, gimbal 210, and/or camera 450, e.g., in a flash memory and/or a removable storage medium such as removable flash card (e.g., an SD or microSD card). In one example embodiment, an application executing on the camera, remote controller, mobile device, etc., may communicate with the camera or the aerial vehicle to update the camera or aerial vehicle to automatically store the owner's contact information. The contact information, e.g., name, phone number, and email address, may be included for storage in a memory, e.g., permanent flash memory, a memory card, etc., every time the memory card is updated and/or re-formatted.

Example Machine Architecture

As has been noted, the remote controlled aerial vehicle 110 can be remotely controlled from the remote controller 120. The aerial vehicle 110 and the remote controller 120 are machines that that be configured operated using software. FIG. 14 is a block diagram illustrating components of an example machine able to read instructions from a machine-readable medium and execute them in one or more processors (or controllers). All or portions of the example machine described in FIG. 14 can be used with the aerial vehicle 110 or the remote controller 120 and/or other parts of a system that interfaces with the aerial vehicle 110 and/or remote controller 120.

In FIG. 14 there is a diagrammatic representation of a machine in the example form of a computer system 1400. The computer system 1400 can be used to execute instructions 1424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a handheld controller to control the remote controlled aerial vehicle. However, the architecture described may be applicable to other computer systems that operate in the system of the remote controlled aerial vehicle with camera and mounting configuration, e.g., in setting up a local positioning system. These other example computer systems include a server computer, a client computer, a personal computer (PC), a tablet PC, a smartphone, an internet of things (IoT) appliance, a network router, switch or bridge, or any machine capable of executing instructions 1424 (sequential or otherwise) that specify actions to be taken by that machine. Further, while only a single machine is illustrated, the term "machine" shall also be taken to include any collection of machines that individually or jointly execute instructions 1424 to perform any one or more of the methodologies discussed herein.

The example computer system 1400 includes one or more processing units (generally processor 1402). The processor 1402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 1400 also includes a main memory 1404. The computer system may include a storage unit 1416. The processor 1402, memory 1404 and the storage unit 1416 communicate via a bus 1408.

In addition, the computer system 1400 can include a static memory 1406, a screen driver 1410 (e.g., to drive screen, e.g., 170, such as a plasma display panel (PDP), a liquid crystal display (LCD), or a projector). The computer system 1400 may also include input/output devices, e.g., an alphanumeric input device 1412 (e.g., a keyboard), a dimensional (e.g., 2-D or 3-D) control device 1414 (e.g., a mouse, a trackball, a joystick, a motion sensor, or other pointing instrument), a signal generation device 1418 (e.g., a speaker), and a network interface device 1420, which also are configured to communicate via the bus 1408.

The storage unit 1416 includes a machine-readable medium 1422 on which is stored instructions 1424 (e.g., software) embodying any one or more of the methodologies or functions described herein. The instructions 1424 may also reside, completely or at least partially, within the main memory 1404 or within the processor 1402 (e.g., within a processor's cache memory) during execution thereof by the computer system 1400, the main memory 1404 and the processor 1402 also constituting machine-readable media. The instructions 1424 may be transmitted or received over a network 1426 via the network interface device 1420.

While machine-readable medium 1422 is shown in an example embodiment to be a single medium, the term "machine-readable medium" should be taken to include a single medium or multiple media (e.g., a centralized or distributed database, or associated caches and servers) able to store the instructions 1424. The term "machine-readable medium" shall also be taken to include any medium that is capable of storing instructions 1424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed configurations beneficially provide an aerial capture platform to capture images, from a mounted camera 450, which may then be transmittable wirelessly to the remote controller 120 and/or other playback device, e.g., a mobile computing system. The images from the camera 450 may be overlaid, e.g., as metadata, with sensor data collected from the aerial vehicle 110 and/or the remote controller 120. The aerial vehicle 110 is configured for portability, e.g., folding arms 135 or landing gear 272, as well as modularity, e.g., arms 135, landing gear 272, and battery. The aerial vehicle 110, remote controller 120, and/or the camera 450 can be registered within a cloud system and the information registered in the cloud can be used to track each and/or communicate about each with the appropriate registrant.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 3-12. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 1402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for an aerial capture platform through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An unmanned aerial vehicle structure comprising:
   a housing;
   a first front arm including a first motor at a first end of the first front arm, the first end of the first front arm being at a first elevational plane when in a closed position;
   a first back arm including a second motor at a first end of the first back arm, the first end of the first back arm being at a second elevational plane when in the closed position, the second elevational plane providing an offset relative to the first elevational plane, the offset allowing a portion of the first back arm to overlap a portion of the first front arm when in the closed position;
   a second front arm including a third motor at a first end of the second front arm, the first end of the second front arm being at the first elevational plane when in the closed position; and
   a second back arm including a fourth motor at a first end of the second back arm, the first end of the second back arm being at the second elevational plane when in the closed position, the second elevational plane providing the offset allowing a portion of the second back arm to overlap a portion of the second front arm when in the closed position;
   wherein the portion of the first front arm and the portion of the first back arm that overlap are parallel to each other when the first front arm and the first back arm are in the closed position;
   wherein the portion of the second front arm and the portion of the second back arm that overlap are parallel to each other when the second front arm and the second back arm are in the closed position;
   wherein each of the first motor, the second motor, the third motor, and the fourth motor include a rotational axis and the rotational axes are all parallel to one another in the closed position and an open position, and
   wherein the rotational axes are orthogonal to the first elevational plane and the second elevational plane in the closed position and the open position.

2. The unmanned aerial vehicle structure of claim 1, wherein each of the first front arm, the first back arm, the second front arm, and the second back arm has a rigid unibody construction that continues around each respective first motor, second motor, third motor, and fourth motor.

3. The unmanned aerial vehicle structure of claim 1, wherein the first front arm has a length with the first end and a second end, the first end of the first front arm rotatably coupled to the housing, the second end of the first front arm having the first motor, the second end of the first front arm being rotatable towards the housing when in the closed position and being rotatable away from the housing when in an open position; wherein the first end of the first front arm is at the first elevational plane.

4. The unmanned aerial vehicle structure of claim 1, wherein the first back arm has a length with the first end and a second end, the first end of the first back arm rotatably coupled to the housing, the second end of the first back arm having the second motor, the second end of the first back arm being rotatable towards the housing when in the closed position and being rotatable away from the housing when in an open position.

5. The unmanned aerial vehicle structure of claim 1, wherein the second front arm has a length with the first end and a second end, the first end of the second front arm rotatably coupled to the housing, the second end of the second front arm having the third motor, the second end of the second front arm being rotatable towards the housing when in the closed position and being rotatable away from the housing when in an open position.

6. The unmanned aerial vehicle structure of claim 1, wherein the second back arm has a length with the first end and a second end, the first end of the second back arm rotatably coupled to the housing, the second end of the second back arm having the fourth motor, the second end of the second back arm being rotatable towards the housing when in the closed position and being rotatable away from the housing when in an open position.

7. The unmanned aerial vehicle structure of claim 1, further comprising:
   a power subsystem within the housing, the power subsystem configured to power the unmanned aerial vehicle structure at a first power level to perform a system check of the unmanned aerial vehicle structure.

8. The unmanned aerial vehicle structure of claim 7, wherein the power subsystem is further configured to power the unmanned aerial vehicle structure at a second power level in response to the system check, the second power level for powering the first motor, second motor, third motor and fourth motor.

9. The unmanned aerial vehicle structure of claim 1, wherein in the closed position, each of the first front arm, the first back arm, the second front arm, and the second back arm are rotated towards a front side of the housing.

10. The unmanned aerial vehicle structure of claim 9, wherein the front side of the housing further comprises a gimbal.

11. The unmanned aerial vehicle structure of claim 9, wherein the housing further comprises a start button located closer to a rear side of the housing than the front side of the housing.

12. The unmanned aerial vehicle structure of claim 1, wherein each of the first front arm, first back arm, second front arm, and second back arm are removably coupled to the housing.

13. The unmanned aerial vehicle structure of claim 1, wherein all of the first front arm, the first back arm, the second front arm, and the second back arm extend in a same direction in the closed position.

\* \* \* \* \*